US012617880B2

(12) United States Patent
Sainani et al.

(10) Patent No.: US 12,617,880 B2
(45) Date of Patent: May 5, 2026

(54) COMPOUNDS FOR USE IN CATALYST COMPOSITIONS FOR THE PRODUCTION OF POLYOLEFINS

(71) Applicant: SABIC GLOBAL TECHNOLOGIES B.V., Bergen op Zoom (NL)

(72) Inventors: Jaiprakash Brijlal Sainani, Vadodara (IN); Nicolaas Hendrika Friederichs, Brunssum (NL); Alexander Voskoboynikov, Moscow (RU); Dmitry Uborsky, Moscow (RU); Kankan Bhaumik, Bangalore (IN); Vincenzo Busico, Naples (IT); Antonio Vittoria, Avella (IT); Roberta Cipullo, Naples (IT); Bogdan Guzeev, Moscow (RU); Oleg Samsonov, Moscow (RU); Pavel Kulyabin, Khimki (RU); Georgy Goryunov, Moscow (RU); Andrey Yashin, Moscow (RU); Akhilesh Tanwar, Bangalore (IN)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 661 days.

(21) Appl. No.: 17/641,708

(22) PCT Filed: Sep. 4, 2020

(86) PCT No.: PCT/EP2020/074839
§ 371 (c)(1),
(2) Date: Mar. 9, 2022

(87) PCT Pub. No.: WO2021/048030
PCT Pub. Date: Mar. 18, 2021

(65) Prior Publication Data

US 2022/0332861 A1 Oct. 20, 2022

(30) Foreign Application Priority Data

Sep. 10, 2019 (EP) .................................... 19196373

(51) Int. Cl.
*C08F 110/02* (2006.01)
*C08F 4/659* (2006.01)
(Continued)

(52) U.S. Cl.
CPC ........ *C08F 110/02* (2013.01); *C08F 4/65908* (2013.01); *C08F 4/6592* (2013.01); *C08F 210/16* (2013.01); *C08F 2420/02* (2013.01)

(58) Field of Classification Search
CPC .. C08F 110/02; C08F 210/16; C08F 2420/02; C08F 4/65908; C08F 4/65912;
(Continued)

(56) References Cited

U.S. PATENT DOCUMENTS 5,276,208 A * 1/1994 Winter .................. C07F 7/0805 556/11
5,990,253 A * 11/1999 van Beek ................ C07F 17/00 556/53
(Continued)

FOREIGN PATENT DOCUMENTS

EP 1059299 A1 12/2000
EP 2832739 A1 2/2015
(Continued)

OTHER PUBLICATIONS

Yoshikawa et al. JP3885660B2 English Translation (Year: 2007).*
(Continued)

*Primary Examiner* — Sally A Merkling
*Assistant Examiner* — Jordan W Taylor
(74) *Attorney, Agent, or Firm* — CANTOR COLBURN LLP

(57) ABSTRACT

The present invention relates to compounds according to formula I, wherein: R1 is a cyclopentadienyl moiety or a moiety comprising a cyclopentadienyl ring structure; R2 is a moiety $M(R5)_2$ or MR5, wherein M is a metal selected from hafnium, titanium or zirconium, and R5 is F, Cl, I, Br or an alkyl-moiety comprising 1 to 10 carbon atoms, preferably methyl, benzyl, butadiene or pentadiene; R3 is H, an alkyl or aryl moiety comprising 1 to 10 carbon atoms, or a moiety comprising N or O and 1 to 15 carbon atoms; R4 is H, an alkyl or aryl moiety comprising 1 to 10 carbon atoms, or a moiety comprising N or O and 1 to 15 carbon atoms, or a halogen; wherein if R3 is H, R4 is a moiety other than H, and if R4 is H, R3 is a moiety other than H; each R6 is individually selected from H, a halogen, an alkyl moiety, an aryl moiety, a halogen-substituted alkyl moiety, a halogen-substitute d aryl moiety, an alkoxy moiety, a siloxy-moiety, or a nitrogen-containing moiety, preferably H. Such compounds may be used in a catalyst system for olefin polymerisation, particularly ethylene copolymerisation, providing at least one of a high catalyst activity, a high comonomer incorporation, and/or a high molecular weight polymer.

(I)

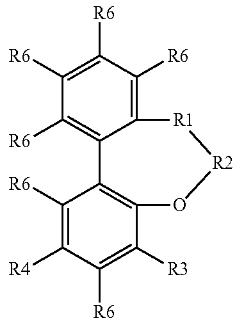

11 Claims, No Drawings

(51) Int. Cl.
*C08F 4/6592* (2006.01)
*C08F 210/16* (2006.01)

(58) Field of Classification Search
CPC ...... C08F 4/6592; C08F 4/659; C08F 210/14; C08F 2500/01; C08F 2500/03; C08F 2500/27; C08F 2500/02; C08F 2500/25; C08F 2500/04
See application file for complete search history.

(56) References Cited

U.S. PATENT DOCUMENTS

| | | | | |
|---|---|---|---|---|
| 6,248,912 | B1 | 6/2001 | Lang et al. | |
| 8,889,581 | B2 * | 11/2014 | Lee | C07D 409/04 502/103 |
| 9,868,797 | B2 | 1/2018 | Sankaran et al. | |
| 2003/0114579 | A1 * | 6/2003 | Mori | C08L 23/10 526/348 |
| 2010/0267908 | A1 | 10/2010 | Michiue et al. | |
| 2015/0025205 | A1 * | 1/2015 | Jian | C08F 4/65925 502/103 |
| 2017/0015767 | A1 | 1/2017 | Canich et al. | |
| 2017/0349734 | A1 * | 12/2017 | Habibi | C08L 23/0815 |
| 2020/0131283 | A1 | 4/2020 | Young et al. | |
| 2020/0270292 | A1 | 8/2020 | Kulangara et al. | |

FOREIGN PATENT DOCUMENTS

| | | | | |
|---|---|---|---|---|
| JP | 2003221411 | A | 8/2003 | |
| JP | 3885660 | B2 * | 2/2007 | C08F 110/02 |
| JP | 2018162231 | A | 10/2018 | |
| KR | 20190063602 | A | 6/2019 | |
| WO | WO-2018127772 | A1 * | 7/2018 | C07F 19/00 |
| WO | 2018164161 | A1 | 9/2018 | |

OTHER PUBLICATIONS

Han et al. WO2018127772A1 English Machine Translation (Year: 2018).*
Turner et al. Organometallics 2004, 23, 1576-1593 (Year: 2004).*
Bakewell et al., "Yttrium Phosphasalen Initiators for rac-Lactide Polymerization", Organometallics 2013, 32, 1475-483.
Friederichs et al., "A combined experimental-molecular modeling apporach for ethene-propene copolymerization with C2-symmetric metallocense", Journal of Molecular Catalysis A: Chemical 242 (2005) p. 91-104.
Halterman et al., "Synthesis, Characterization, and Polymerization Properties of Bis(2-menthylindenyl)zirconium Dichloride and Bis(2-menthyl-4,7-dimethylindenyl)zirconium Dichloride" Organometallics, vol. 19, No. 25, 2000, 5464-5470.
Hanaoka et al., "Synthesis and characterization of titanium and zirconium complexes with silicone-bridged phenoxycyclopentadienyl ligands", Journal of Organometallic Chemistry 692 (2007) 4059-4066.
International Search Report for International Application No. PCT/EP2020/074839, International Filing Date Sep. 4, 2020, Date of Mailing Nov. 19, 2020, 5 pages.
Klet et al., "Highly regioirregular polypropylene from asymmetric group 4 anilide(pyridine)phenoxide complexes", Chem. Commun., 2012, 48, 6657-6659.
McDaniel et al.in Macromolecules 2010 (43) p. 8836-8852.
Nicholas et al., "Electrocatalytic Reduction of CO2 to Formate by an Iron Schiff Base Complex", Inorg. Chem. 2018, 57, 2111-2121.
Probst et al., "Intramolecular Pd-Catalyzed Anomeric C(sp3)-H Activation of Glycosyl Carboxamides" Org. Lett. 2017, 19, 5038-5041.
Randall et al. "A Review of High Resolution Liquid Carbon Nuclear Magnetic Resonance Characterizations of Ethylene-Based Polymers", Journal of Macromolecular Science—Reviews in Macromolecular Chem & Phys, C29 vol. 2 & 3, 1989, 16 pages.
Rimkus et al., "Dissymmetric ansa zirconocene complexes with di- and trisubstituted indenyl ligands as catalysts for homogeneous ethylene homo- and ethylene/1-hexene copolymerization reactions", Polyhedron 126 (2017) 72-82.
Roy et al., "A quick Chan-Lam C—N and C—S cross coupling at room temperature in the presence of square pyramidal [Cu(DMAP)4I]I as a catalyst", Chem. Commun., 2016,52, 1170-1173.
Written Opinion for International Application No. PCT/EP2020/074839, International Filing Date Sep. 4, 2020, Date of Mailing Nov. 19, 2020, 9 pages.
Yang et al., "Palladium(0)-catalyzed asymmetric C(sp3)-H arylation using a chiral binol-derived phosphate and an achiral ligand", Chem. Sci., 2017, 8, 1344-1349.
Yano et al. "High-Temperature Ethylene/a-Olefin Copolymerization with a Zirconocene Catalyst: Effects of the Zirconocene Ligand and Polymerization Conditions on Copolymerization Behavior" Journal of Polymer Science: Part A: Polymer Chemistry, vol. 38, 4641-4648 (2000).
Zhu et al., "A Facile FeCl3/12-Catalyzed Aerobic Oxidative Coupling Reaction: Synthesis of Tetrasubstituted Imidazoles from Amidines and Chalcones", Org. Lett. 2015, 17, 3872-3875.

* cited by examiner

COMPOUNDS FOR USE IN CATALYST COMPOSITIONS FOR THE PRODUCTION OF POLYOLEFINS

CROSS REFERENCE TO RELATED APPLICATIONS

This application is a National Stage application of PCT/EP2020/074839, filed Sep. 4, 2020, which claims the benefit of European Application No. 19196373.5, filed Sep. 10, 2019, both of which are incorporated by reference in their entirety herein.

The present invention relates to compounds that are suitable for use as single-site type catalyst for the production of polyolefins, in particular for the production of ethylene-based polymers. The compounds display in a polymerisation of ethylene a high reactivity towards comonomers such as α-olefins, and allow for the production of ethylene-based copolymers having a high molecular weight.

Copolymers of ethylene and other olefins find widespread commercial application. For instance, medium-density polyethylene (MDPE), linear low-density polyethylene (LLDPE), polyolefin plastomers (POP), polyolefin elastomers (POE), and even ethylene-propylene-diene terpolymers (EPDM) are polymers that are typically produced using ethylene and other olefinic comonomers, using a transition metal-based catalyst. In commercial applications, the molecular weights of these polymers, expressed as the weight-averaged molecular weight ($M_w$) are typically above 10 kg/mol, more typically above 50 kg/mol, but also may be above 100 kg/mol, for such polymers to be of significant commercial importance.

In addition, the industrially important bimodal high-density polyethylene (HDPE) is used in certain high-demanding applications, for instance in pressure pipes. This bimodal HDPE comprises a low molecular weight homopolymer of ethylene, and a high molecular weight ethylene-based copolymer. The high molecular weight copolymer fraction in such bimodal HDPE typically has an $M_w$ of above 100 kg/mol, and for specific applications, the $M_w$ of the copolymer may even need to be above 300 kg/mol or even above 500 kg/mol.

Also, the ultra-high molecular weight polyethylene (UHMwPE), with $M_w$ of above 1000 kg/mol is often commercialised as a copolymer of ethylene and a small amount of comonomer, for example in applications that require very high impact resistance or low creep in fiber applications.

Hence, it is important to develop compounds that are suitable as catalysts to produce high molecular weight ethylene-based polymers.

In an industrial production process for the production of ethylene-based polymers, it is highly advantageous that the applied catalyst displays a high reactivity for the comonomer. It is well known in the art that the reactivity of α-olefins compared to ethylene decreases upon increase of the size of the α-olefin. In the context of the present invention, suitable α-olefins for use as comonomer in ethylene polymerisation reactions may for example be propylene, 1-butene, 1-hexene and 1-octene. For instance, the reactivity in copolymerisations with ethylene is understood to decrease from propylene>1-butene>1-hexene>1-octene, as published for example by Krentsel et al. in Polymers and Copolymers of Higher Alpha-Olefins, Carl Hanser Verlag, München, 1997, and by McDaniel et al. in Macromolecules, 2010(43), p. 8836-8852. As pointed out by Kissin in Transition Metal catalysed Polymerizations, Alkenes and Dienes, Quirck, R. P. (ed.), Harwood Academic Publishers, New York, 1983, part B, p. 597-615, this lower reactivity of the comonomer compared to ethylene is mainly due to steric crowding close to the reactive olefin bond. This may be understood to demonstrate why branched olefins, such as for instance 3-methyl-butene-1, 4-methyl-pentene-1, vinyl cyclohexane or iso-butene are in general more difficult to incorporate compared to for instance propylene or 1-butene. If the reactivity of the comonomer is low, one needs to apply relatively high concentrations of the comonomer during the polymerisation process in order to incorporate significant, desirable amounts in the copolymer.

Such high concentrations are undesirable in industrial processes because the unreacted monomer needs to be separated from the polymer and subsequently recycled, which is an energy-intensive process, especially for comonomers with relatively high boiling points. In addition, in for example fluidised-bed gas-phase polymerisation processes, high amounts of liquid comonomers in the reactor can be detrimental to the fluidisation of the reactor contents. Therefore, especially when copolymerising ethylene with higher α-olefins or sterically encumbered olefins, catalysts are needed that display a high reactivity towards such comonomers.

Further, in the preparation of copolymers of ethylene and α-olefins, it is understood that the $M_w$ of the obtained copolymers tends to decrease upon increasing the α-olefin content of the copolymer, which for example has been published by Friederichs et al., J. Mol. Cat. A: Chemical, 242 (2005), p. 91-104. The combination of high comonomer incorporation and high molecular weight is therefore a challenging target for developing commercially available catalysts.

Numerous catalysts for copolymerisation of ethylene with other olefins are known. For example, it is widely accepted that conventional heterogeneous catalysts such as the so-called Ziegler- and Philips-type catalysts contain multiple different catalytically active species that translate into a heterogeneous mixture of polymers differing in molecular weight and comonomer content.

When characterising the copolymers produced with such catalysts, this heterogeneity is observable from a broad polydispersity ($M_w/M_n$) as measured by techniques such as size exclusion chromatography (SEC) and a broad compositional distribution as measured by techniques such as for instance Temperature Rising Elusion Fractionation (TREF) or Crystallisation Elution Fractionation (CEF). Such broad polydispersity and broad composition distribution can translate into certain sub-optimal mechanical properties of the polymer. In contrast, discrete single-site catalysts, such as the well-known metallocene-type compounds, typically result in a single catalytically active specie that translates into a narrow polydispersity and narrow composition distribution, and eventually improved mechanical properties of the resulting copolymers.

In J. Polym. Sci. Part A: Polym. Chem., 2000 (38), p. 4641-4648, Yano et al. describe metallocene catalyst bearing a ligand containing a cyclopentadienyl and a substituted fluorenyl moiety for the production of high molecular weight ethylene/α-olefin copolymers. These catalysts as described by Yano et al. result in high molecular weight copolymers, even at high polymerisation temperatures, which illustrates that these catalysts can be considered as good catalyst for the preparation of copolymers with ethylene and α-olefins. However, it does not teach about the copolymerisation capability of these catalysts for preparing copolymers of ethylene with sterically encumbered comonomers such as 4-methyl-pentene-1 or vinyl cyclohexane, EP668865 describes bis-2-indenyl metallocenes. EP1059299 describes bis-2-indenyl metallocenes, in which the bridging moiety contains at least one sp2-hybridised carbon bonded to the indenyl at the 2-position, including 2,2'-biphenylene bridged metallocenes such as for example 2,2'-bis(2-indenyl)biphenyl metallocenes. The described metallocenes in these documents do not provide the desired degree of comonomer incorporation and/or the desired high molecular weight of the obtained copolymer.

WO2015/014832 describes the synthesis of biphenylene bridged 2-indenyl-amido compounds. WO2015/014832 teaches that such amido compounds, when used as catalyst component in ethylene-alpha-olefin copolymerization, can lead to enhanced comonomer incorporation.

U.S. Pat. No. 6,248,912 describes half-metallocenes containing an amido moiety and a 2-indenyl ligand, bridged by a single carbon or an ethylene moiety. These catalysts display acceptable comonomer reactivity, but despite the low polymerisation temperature of 20° C., the intrinsic viscosities of the copolymers are rather low, indicative of a limited capability of these systems to produce high molecular weight copolymers.

US20100267908 describes bridged transition-metal compounds containing a 2-indenyl moiety and an ortho-phenoxy ligand. The molecular weights of the ethylene/α-olefin copolymers obtained with these catalysts are very low, typically below 5 kg/mol, which is prohibitively low for many commercial applications.

JP3885660 describes half-metallocenes in which a tetramethylcyclopentadienyl moiety is connected to an ortho-phenoxy ligand via a Si—Si, C—C, or Si—C bridge. The resulting catalysts display very modest activity for ethylene homopolymerisations and the polymers have a broad polydispersity, indicative of non-single site behaviour of the catalyst system. JP 3885660 does not disclose copolymerisation of ethylene with α-olefins or sterically encumbered olefins.

Accordingly, despite all efforts there continues to be a need for development of a catalyst which is capable of producing polyolefins in high yield, with high reactivity towards comonomer incorporation, such as for example incorporation of α-olefins or sterically encumbered olefins in ethylene polymerisation, and giving high molecular weight copolymers.

This is now achieved according to the present invention by a compound according to formula I:

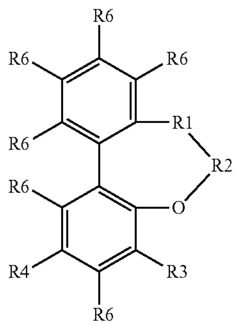

wherein:

R1 is a cyclopentadienyl moiety or a moiety comprising a cyclopentadienyl ring structure;

R2 is a moiety $M(R5)_2$ or MR5, wherein M is a metal selected from hafnium, titanium or zirconium, and R5 is F, Cl, I, Br or an alkyl-moiety comprising 1 to 10 carbon atoms, preferably methyl, benzyl, butadiene or pentadiene;

R3 is H, an alkyl or aryl moiety comprising 1 to 10 carbon atoms, or a moiety comprising N or O and 1 to 15 carbon atoms;

R4 is H, an alkyl or aryl moiety comprising 1 to 10 carbon atoms, or a moiety comprising N or O and 1 to 15 carbon atoms, or a halogen;

wherein if R3 is H, R4 is a moiety other than H, and if R4 is H, R3 is a moiety other than H;

each R6 is individually selected from H, a halogen, an alkyl moiety, an aryl moiety, a halogen-substituted alkyl moiety, a halogen-substituted aryl moiety, an alkoxy moiety, a siloxy-moiety, or a nitrogen-containing moiety, preferably H.

Such compounds may be used in a catalyst system for olefin polymerisation, particularly ethylene copolymerisation, providing at least one of a high catalyst activity, a high comonomer incorporation, and/or a high molecular weight polymer.

Preferably, the compound is a compound according to formula II:

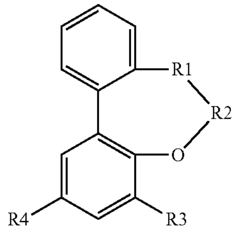

wherein:

R1 is a cyclopentadienyl moiety or a moiety comprising a cyclopentadienyl ring structure;

R2 is a moiety $M(R5)_2$ or MR5, wherein M is a metal selected from hafnium, titanium or zirconium, and R5 is F, Cl, I, Br or an alkyl-moiety comprising 1 to 10 carbon atoms, preferably methyl, benzyl, butadiene or pentadiene;

R3 is H, an alkyl or aryl moiety comprising 1 to 10 carbon atoms, or a moiety comprising N or O and 1 to 15 carbon atoms;

R4 is H, an alkyl or aryl moiety comprising 1 to 10 carbon atoms, or a moiety comprising N or O and 1 to 15 carbon atoms, or a halogen;

wherein if R3 is H, R4 is a moiety other than H, and if R4 is H, R3 is a moiety other than H.

In the compounds of the present invention, R1 may for example be a substituted or unsubstituted cyclopentadienyl, 1-indenyl, or 2-indenyl moiety. For example, R1 may be a moiety selected from:

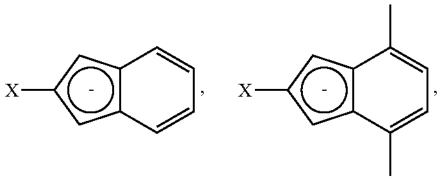

-continued

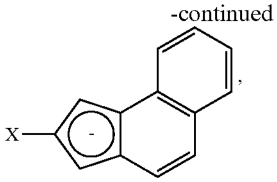,
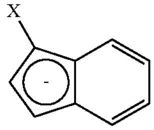,
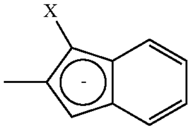,
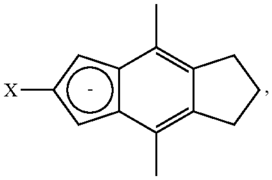,
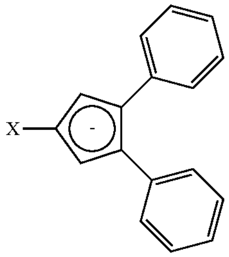,
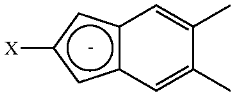, or
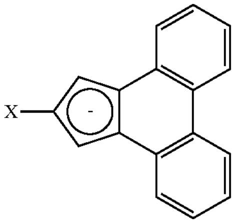

wherein X indicates the position wherein the moiety R1 is bound to the bridging moiety.

Preferably, M is titanium. R2 may for example be selected from $ZrCl_2$, $TiCl_2$, $HfCl_2$, $Zr(CH_3)_2$, $Ti(CH_3)_2$, $Hf(CH_3)_2$, $Zr(benzyl)_2$, $Ti(benzyl)_2$, $Hf(benzyl)_2$, Ti(1,3-butadiene) or Ti(1,3-pentadiene). Preferably, R2 is $TiCl_2$. or $Ti(CH_3)_2$.

Each R3 and R4 individually may for example be selected from fluorine, a methyl moiety, a phenyl moiety, a t-butyl moiety, a methoxy moiety, or a 9-carbazole moiety.

In catalyst systems for the polymerisation of olefins, the compounds of the invention can be used in combination with any activator that renders the system catalytically active in olefin polymerisation. Examples of such activators are for instance aluminoxanes such as methyl aluminoxanes (MAO), methyl-isobutyl aluminoxanes, and isobutyl aluminoxanes. Other suitable activators may for example be boron-based compounds, such as boron compounds containing (per)fluorinated aryl substituents, for example tris(pentafluorophenyl)borane and tetrakis(pentafluorophenyl)borate compounds. Examples of the latter are ammonium salts or trityl compounds of tetrakis(pentafluorophenyl)borate.

The catalysts based on the compounds of the present invention may be used in unsupported form, or may be used on a support material such as for instance polymeric supports, clay materials or inorganic oxides, such as for example silica or alumina. Alternatively, fluorided silica-alumina supports or sulfated alumina supports may be used. The methods for preparation of such supported polymerisation catalyst based on the compounds of the present invention are well known in the art.

Preferably, the support is a silica having a surface area between 200 and 900 $m^2/g$ and/or a pore volume of >0.5 and <4.0 ml/g.

Alternatively, the support materials may be polymeric support materials, such as polyvinyl chloride, polystyrene, polyethylene or polypropylene.

The invention further also relates to a process for the preparation of olefin polymers by polymerisation of one or more olefins in the presence of a catalyst system comprising a compound of the present invention, in particularly wherein the catalyst system comprises a compound of the present invention and an activator, for example wherein the compound of the present invention is immobilised on a support.

In such process for the preparation of olefin polymers in the presence of a compound according to the invention, preferably a main group organometallic compound is present that can act as a scavenger compound to scrub impurities from the polymerisation system that might otherwise adversely affect the catalyst activity.

When R5 in moiety R2 is a halogen, an alkoxide moiety or an amine moiety, an additional function of this main group organometallic compound is to substitute R5 with an organic group, for example to substitute R5 with an alkyl or aralkyl moiety such as a methyl, ethyl, propyl, isopropyl, butyl, isobutyl or benzyl moiety. This function of the main group organometallic compound is particularly advantageous when an activator other than an aluminoxanes is used. Suitable main group organometallic compounds are those able to exchange at least one or its organic moieties with R5 in the compounds of the invention.

For example, organolithium compounds, organomagnesium compounds, organoaluminium compounds, organozinc compounds, or mixtures thereof, may be used as such main group organometallic compound. Preferably, the main group organometallic compound is an organoaluminium compound. Suitable organoaluminium compounds are for example trimethylaluminium, triethylaluminium, triisopropylaluminium, tri-n-propylaluminium, triisobutylaluminium, tri-n-butylaluminium, tri-tert-butylaluminium, triamylaluminium, tri-n-hexylaluminium, trioctylaluminium, dimethylaluminium ethoxide, diethylaluminium ethoxide, diisopropylaluminium ethoxide, di-n-propylaluminium ethoxide, diisobutylaluminium ethoxide, di-n-butylaluminium ethoxide, dimethylaluminium hydride, diethylaluminium hydride, diisopropylaluminium hydride, di-n-propylaluminium hydride, diisobutylaluminium hydride, and di-n-butylaluminium hydride. Mixture of these organoaluminium compounds are also suitable. Alternatively, aluminoxanes may be used as such main group organometallic compound. Examples of suitable aluminoxanes are methylaluminoxanes, methyl-isobutylaluminoxanes, isobutylaluminoxanes, and mixtures thereof.

In certain embodiments, it may be suitable to combine the main group organometallic compound with a compound containing at least one active hydrogen. Such combination may be done in-situ or ex-situ. In the present context, an active hydrogen means that the hydrogen atom is able to react with the main group organometallic compound. Suitable compounds comprising at least one active hydrogen in the context of the present invention are for example alcohol compounds, silanol compounds, and amine compounds. Suitable amine compounds are sterically encumbered amine compounds. Example of sterically encumbered amine compounds are cyclohexyl amine or an alkylamine comprising at least one aliphatic group having at least four carbon atoms. Suitable alcohol compounds are preferably sterically encumbered alcohol compounds, such as substituted phenolic compounds. In principle, any substituted mono- or polyphenolic compound may be used. Suitable substituted monophenolic compounds are for example butylated hydroxytoluene (BHT, 2,6-di-t-butyl-4-methylphenol), 2,6-di-t-butylphenol, and α-tocopherol (vitamin E). Preferably, the compound comprising at least one active hydrogen is such that after combining this compound with the main group organometallic compound, the latter still contains organometallic bonds, preferably at least one organometallic bond per main group metal atom.

The process to produce the olefin polymers may start with the reaction of a compound of the invention and an activator, optionally in the presence of the main group organometallic compound, optionally in the presence of a compound comprising at least one active hydrogen atom, optionally in the presence of a suitable support material. This reaction may be performed in the same vessel as the reaction vessel wherein the olefin polymers are produced, or may be a separate vessel. It may be advantageous to combine the inventive compound at first with a portion of the quantity of the main group organometallic compound that is to be used, optionally in the presence of the compound containing at least one active hydrogen, before mixing with the activator. The resulting mixture may be fed to a polymerisation reactor. During the reactions as described here above, an inert solvent may be used.

The polymerisation reaction may be carried out in a slurry process, a solution process, or a gas-phase process.

The activator may be an aluminoxane-based activator. When a mixture of the inventive compound and such aluminoxanes-based activator is used, the activator may preferably be used in a quantity of between 10 and 100,000 moles of aluminium, preferably of between 10 and 10,000 moles of aluminium, per mole of the transition metal in the inventive compound.

Alternatively, the activator may be an organoboron-based activator. When a mixture of the inventive compound and such organoboron-based activator is used, the activator may preferably be used in a quantity of between 0.1 and 100 moles of boron, preferably of between 0.5 and 50 moles of boron, per mole of the transition metal in the inventive compound.

When the polymerisation is performed in a slurry process, the solvent that is used may be any organic solvent as is typically used in olefin polymerisation processes. For example, the solvent may be benzene, toluene, xylene, propane, butane, pentane, hexane, heptane, cyclohexane, methylcyclohexane, and methylchloride. Alternatively the olefin that is to be polymerised may be used as solvent.

In the process to produce olefin polymers, the polymerisation conditions such as temperature, time, pressure, and monomer concentration may be chosen within wide limits. The polymerisation temperature may for example be in the range of between −100° C. and 300° C., preferably between 0° C. and 240° C., more preferably between 50° C. and 200° C. The polymerisation time may for example be in the range from 10 seconds to 20 hours, preferably from 1 minute to 10 hours, more preferably from 3 minutes to 5 hours. In the polymerisation of ethylene, the ethylene pressure may for example be in the range of from 1 to 3500 bar, preferably from 1 to 2500 bar, more preferably from 1 to 1000 bar, even more preferably from 1 to 500 bar, yet even more preferably from 1 to 100 bar.

The molecular weight of the polymer may be controlled by well-known means such as the use of hydrogen or zinc-alkyls in the polymerisation. The polymerisation may be conducted in a batch process, a semi-continuous process, or a continuous process. The polymerisation may be conducted in two or more steps of different polymerisation conditions. The polymer that is produced may be separated from the solvent that is employed in the polymerisation reaction and from residual monomers and optionally comonomers, and dried by methods known to the person skilled in the art.

In a process for the production of olefin polymers using the compounds of the present invention, the polymerisation may involve a homopolymerisation of an olefin monomer, or a copolymerisation of an olefin monomer and one or more comonomer(s). The olefin monomer may for example be ethylene or propylene. The comonomer may for example be ethylene, propylene, 1-butene, 1-pentene, 3-methyl-1-butene, 3,3,-dimethylbutene, 4-methyl-1-pentene, 3-methyl-1-pentene, 1-hexene, 1-octene, 1-nonene, 1-decene; a conjugated or a non-conjugated diene such as butadiene, 1,4-hexadiene, a substituted or unsubstituted norbornene, 5-ethylidene-2-norbornene, dicyclopentadiene, 4-methyl-1,4-hexadiene, 1,9-decadiene, or 7-methyl-1,6-octadiene; cyclic olefins such as cyclobutene, cyclopentene; or other olefinic compounds such as isobutene, vinyl cyclohexane, or styrene.

Preferably, the olefin monomer is ethylene. The polymer produced using ethylene as olefin monomer may be referred to as an ethylene homopolymer, or, is case that the polymerisation is a copolymerisation reaction, an ethylene copolymer. Such ethylene homopolymers and copolymers may together be referred to as polyethylenes. Preferably, the comonomer is an olefin having 3 or more carbon atoms, for example an olefin comprising 3 to 10 carbon atoms, such as an α-olefin comprising 3 to 10 carbon atoms.

Preferably, the comonomer is selected from 1-butene, 1-hexene, 1-octene, norbornene, vinyl-cyclohexane, styrene, and 4-methyl-1-pentene. Preferably, the olefin monomer is ethylene, and the comonomer is selected from 1-butene, 1-hexene, 1-octene, norbornene, vinyl-cyclohexane, styrene, and 4-methyl-1-pentene.

Preferably, the process for the production of olefin polymers using the compounds of the present invention is copolymerisation of an olefin monomer and one or more comonomer(s), wherein the olefin monomer is ethylene, and the comonomer is selected from 1-butene, 1-hexene, 1-octene, norbornene, vinyl-cyclohexane, styrene, and 4-methyl-1-pentene. Particularly preferable, the process for the production of olefin polymers using the compounds of the present invention is copolymerisation of an olefin monomer and one or more comonomer(s), wherein the olefin monomer is ethylene, and the comonomer is selected from 1-butene, 1-hexene, vinylcyclohexane, and 1-octene.

In case that the polymerisation is a copolymerisation of an olefin and one or more comonomer(s), the olefin and the comonomer(s) are different compounds.

The olefin polymer may for example comprise from 1.0 to 80.0 wt. % of moieties derived from the comonomer, preferably from 5.0 to 60.0 wt %, more preferably from 10.0 to 50.0 wt %, or from 10.0 to 30.0 wt %, with regard to the total weight of the olefin polymer. The ethylene copolymer may for example comprise from 1.0 to 80.0 wt. % of moieties derived from the comonomer, preferably from 5.0 to 60.0 wt %, more preferably from 10.0 to 50.0 wt %, or from 10.0 to 3.00 wt %, with regard to the total weight of the ethylene copolymer.

The polyethylene may for example have a melt mass-flow rate as determined in accordance with ASTM D1238-10 at 190° C. at a load of 2.16 kg ($MFI_{2.16}$) of ≤0.1 and ≥125 g/10 min. For example, the polyethylene may have an $MFI_{2.16}$ of ≥0.1 and ≤50 g/10 min, or ≥0.3 and ≤10.0 g/10 min, or ≥0.5 and ≤5.0 g/10 min.

The polyethylene may for example have a density of ≥855 $kg/m^3$ and ≤965 $kg/m^3$, as determined in accordance with ASTM D1505-10. The polyethylene may for example have a density of ≥855 and ≤910 $kg/m^3$, or of ≥875 and ≤900 $kg/m^3$. The polyethylene may for example have a density of ≥910 and ≤925 $kg/m^3$, or of ≥910 and ≤920 $kg/m^3$, or of ≥915 and ≤920 $kg/m^3$. The polyethylene may for example have a density of ≥925 and ≤940 $kg/m^3$, or of ≥930 and ≤940 $kg/m^3$. The polyethylene may for example have a density of ≥940 and ≤965 $kg/m^3$, or of ≥945 and ≤960 $kg/m^3$.

It has been found that using the compounds of the present invention, it is possible to produce ethylene copolymers wherein the comonomer is selected from 1-butene, 1-hexene, and 1-octene with particularly high incorporation of the comonomer. The amount of incorporation of the comonomer may be expressed as the amount of short chain branches per 1000 carbon atoms in the polymer. The amount of short chain branches may for example be determined using $^{13}C$ NMR via the method as described by Randall, Rev. Macromol. Chem. Phys., C. 29, V. 2&3, p. 285-297. The ethylene copolymer may for example comprise at least 10, 25, or 80 short chain branches per 1000 carbon atoms in the polymer. The ethylene copolymer may comprise at most 50, 40, 30 or 25 short chain branches per 1000 carbon atoms in the polymer. The ethylene copolymer may for example comprise at least 10 and at most 50 short chain branches per 1000 carbon atoms in the polymer, or at least 15 and at most 40, or at least 20 and at most 30.

The polyethylene may have a number-average molecular weight ($M_n$) of between 1,000 and 1,000,000 g/mol, preferably between 10,000 and 500,000 g/mol, more preferably between 20,000 and 250,000 g/mol. The polyethylene may have a weight-average molecular weight ($M_w$) of between 500 and 5,000,000 g/mol, preferably between 5,000 and 1,000,000 g/mol, more preferably between 10,000 and 500,000 g/mol. The $M_w$ and $M_n$ are determined in accordance with ASTM D6474-12, using 1,2,4-trichlorobenzene or o-dichlorobenzene as solvent, and calibrated using polyethylene or polystyrene standards. The polyethylene may for example have a molecular weight distribution $M_w/M_n$ of ≥2.0 and ≤5.0, or ≥2.1 and ≤4.0, or ≥2.5 and ≤3.5.

The invention will now be illustrated by the following non-limiting examples.

Compounds

A number of compounds as listed in the table below were produced. The compounds C-1 through C-6 were provided as comparative materials, the compounds I-1 through I-15 demonstrate the present invention.

C-1

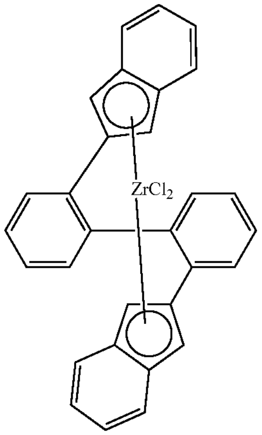

-continued

C-2

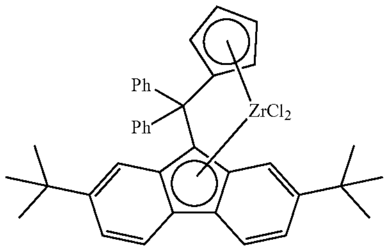

C-3

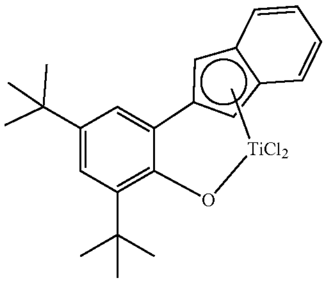

C-4

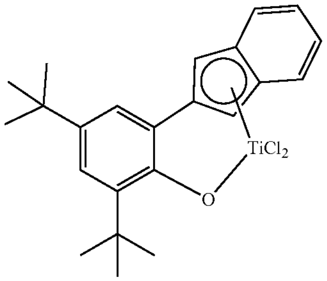

C-5

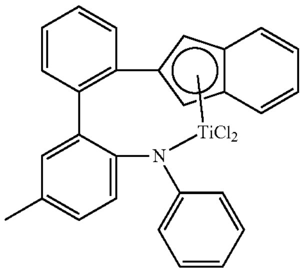

C-6

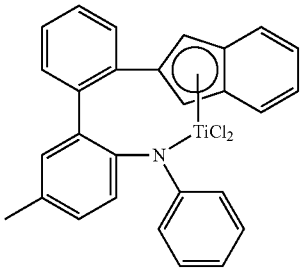

-continued
I-1
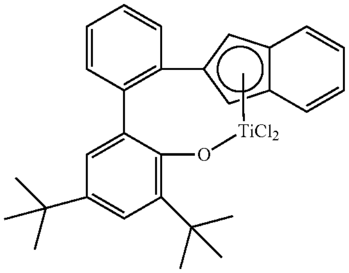
I-2
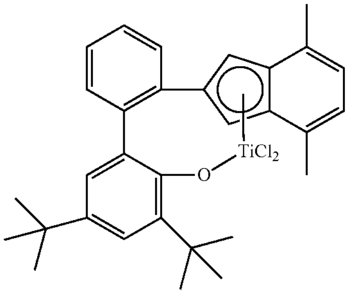
I-3
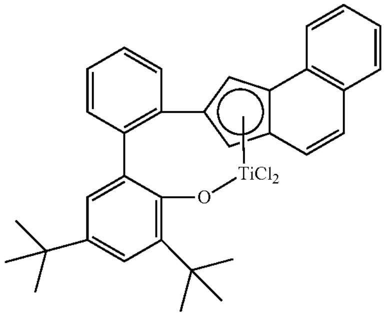
I-4
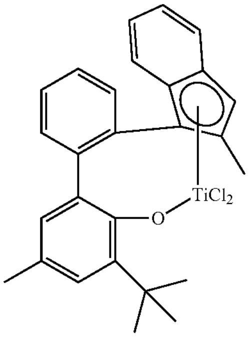
I-5
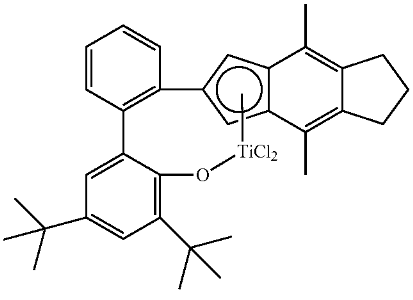
-continued
I-6
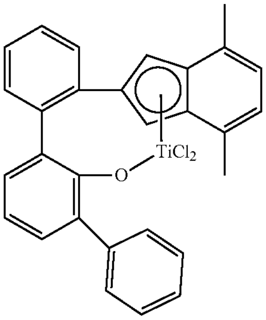
I-7
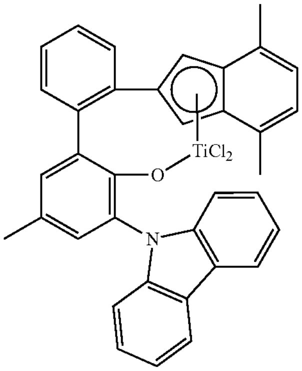
I-8
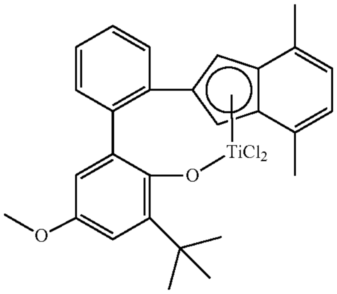
I-9
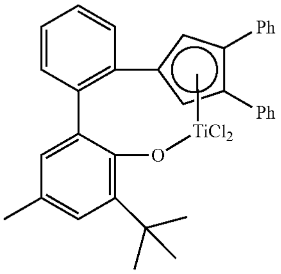
I-10
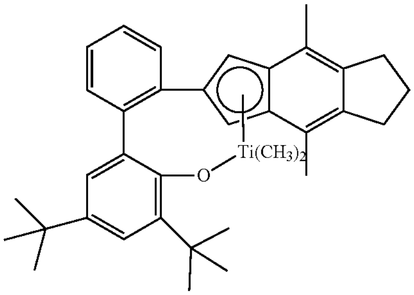

-continued

I-11

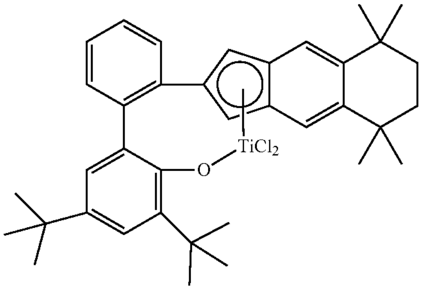

I-12

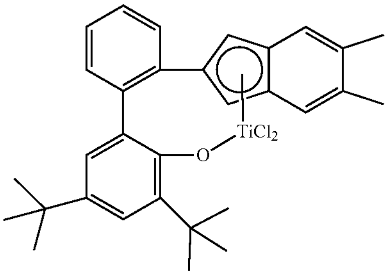

I-13

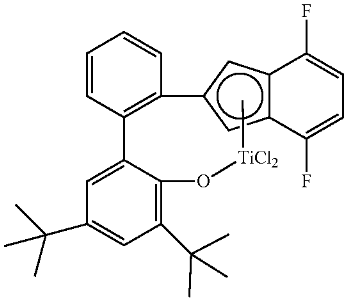

I-14

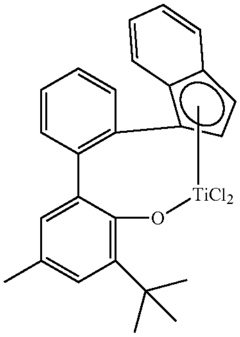

I-15

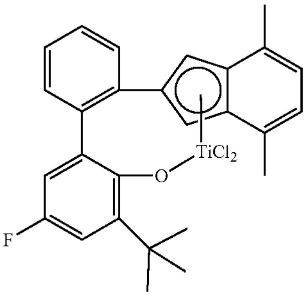

Summary of Ligands Used in Inventive Compounds

| Compound | R1 | R2 | R3 | R4 |
|---|---|---|---|---|
| I-1 | 2-indenyl | $TiCl_2$ | t-butyl | t-butyl |
| I-2 | 4,7-dimethyl-2-indenyl | $TiCl_2$ | t-butyl | t-butyl |
| I-3 | benz[e]-2-indenyl | $TiCl_2$ | t-butyl | t-butyl |
| I-4 | 2-methyl-1-indenyl | $TiCl_2$ | t-butyl | methyl |
| I-5 | 5,6,7-trihydro-4,8-dimethyl-s-indacenyl | $TiCl_2$ | t-butyl | t-butyl |
| I-6 | 4,7-dimethyl-2-indenyl | $TiCl_2$ | phenyl | — |
| I-7 | 4,7-dimethyl-2-indenyl | $TiCl_2$ | 9-carbazole | methyl |
| I-8 | 4,7-dimethyl-2-indenyl | $TiCl_2$ | t-butyl | methoxy |
| I-9 | 3,4-diphenyl-cyclopentadienyl | $TiCl_2$ | t-butyl | methyl |
| I-10 | 1,2,3,5-tetrahydro-4,8-dimethyl-6-indacenyl | $Ti(CH_3)_2$ | t-butyl | t-butyl |
| I-11 | 5,5,8,8-tetramethyl-5,6,7,8-tetrahydro-2-cyclopentyl[b]naphthalene | $TiCl_2$ | t-butyl | t-butyl |
| I-12 | 5,6-dimethyl-2-indenyl | $TiCl_2$ | t-butyl | t-butyl |
| I-13 | 4,7-difluoro-2-indenyl | $TiCl_2$ | t-butyl | t-butyl |
| I-14 | 1-indenyl | $TiCl_2$ | t-butyl | methyl |
| I-15 | 4,7-dimethyl-2-indenyl | $TiCl_2$ | t-butyl | fluoro |

Compound I-10 was obtained by methylation of compound I-5 according to procedures known in the art.

Syntheses

Syntheses of Phenoxy-Compounds:

All manipulations with air- and moisture-sensitive compounds were carried out under argon or nitrogen atmosphere using standard glove box, Schlenk, and high-vacuum line techniques. THF and diethyl ether were dried over sodium benzophenone ketyl. All organic chemicals, $TiCl_4$, $Ti(NMe_2)_4$, $Ti(NMe_2)_2Cl_2$ were purchased and used as received from Aldrich. NMR spectra of substances and precatalysts were recorded on Bruker AV400 spectrometer for 1-3% solutions in deuterated solvents. NMR solvents were purchased from Deutero GmbH. Chemical shifts were reported using the residual solvent signal. 4,8-Dimethyl-1,2,3,5-tetrahydro-s-indacene [US 2017/0015767], 2-bromo-4,7-dimethyl-1H-indene [R. L. Halterman et al., *Organometallics* 2000, 19, 5464], 2-bromo-5,6-dimethyl-1H-indene [WO 2018164161], 2-bromo-3H-cyclopenta[a]naphthalene [WO 2017118617], 3-(2-bromophenyl)-1-phenylprop-2-en-1-one [Y. Zhu et al., *Org. Left.* 2015, 17, 3872], 2-(methoxymethoxy)-1,1'-biphenyl [JP 2018162231], 2-bromo-4,6-di-tert-butylphenol [A. V. Nichols et al., *Inorg. Chem.* 2018, 57, 2111], 2-bromo-6-(tert-butyl)-4-methoxyphenol [C. Bakewell et al., *Organometallics* 2013, 32, 1475], 2-(allyloxy)-1-bromo-3-(tert-butyl)-5-methylbenzene [H. Hanaoka et al., *J. Organomet. Chem.* 2007, 692, 4059], 2-(3,5-di-tert-butyl-2-(methoxymethoxy)phenyl)-4,4,5,5-tetramethyl-1,3,2-dioxaborolane [R. C. Klet et al., *Chem. Comm.* 2012, 48, 6657], 3,4-diphenylcyclopent-2-en-1-one [E. Polo et al., *Eur. J. Inorg. Chem.* 2003, 2, 324], and 9-(2-(methoxymethoxy)-5-methyl-3-(4,4,5,5-tetramethyl-1,3,2-dioxaborolan-2-yl)phenyl)-9H-carbazole [WO 2018170138] were prepared according to the literature procedures.

6-Bromo-4,8-dimethyl-1,2,3,5-tetrahydro-s-indacene To a stirred solution of 78.6 g (427 mmol) of 4,8-dimethyl-1,2,3,5-tetrahydro-s-indacene in a mixture of 850 ml of DMSO and 450 ml of THF 15.35 g (852 mmol) of water was added. To this mixture 79.6 g (447 mmol) of N-bromosuccinimide was added in portions during 1 h at 0° C., and this mixture was stirred for 12 h. The resulting yellow solution was poured into 2 L of water, and the formed mixture was extracted with 5×150 ml of dichloromethane. The combined organic extract was washed with 6×300 ml of water, dried over $Na_{2a}SO_4$ and then concentrated under reduced pressure. The residue thus obtained was triturated with 300 ml of n-hexane, the formed suspension was filtered off (G3), and thus obtained precipitate was in vacuum dried to give 2-bromo-4,8-dimethyl-1,2,3,5,6,7-hexahydro-s-indacen-1-ol as a white powder. To a solution of 2-bromo-4,8-dimethyl-1,2,3,5,6,7-hexahydro-s-indacen-1-ol (prepared above) in 1150 ml of toluene 3.9 g of TsOH was added, and this mixture was refluxed with Dean-Stark head for 15 min. The resulting solution was rapidly cooled in a water bath and then washed by 10% $Na_2CO_3$. The organic layer was separated, the aqueous layer was extracted with 2×200 ml of toluene. The combined organic extract was dried over $K_2CO_3$, concentrated and purified by flash chromatography on silica gel 60 (40-63 um; eluent: hexanes-dichloromethane=10:1). This procedure gave 67.7 g (60% for two stages) of 6-bromo-4,8-dimethyl-1,2,3,5-tetrahydro-s-indacene as a white solid.

2-(Bromomethyl)-1,4-difluorobenzene A mixture of 192 g (1.50 mol) of 1,4-difluoro-2-methylbenzene, 281 g (1.58 mol) of N-bromosuccinimide, and 1.0 g of azobisisobutyronitrile in 1000 ml of tetrachloromethane was refluxed for 4 h. Further on, this mixture was cooled to room temperature, the precipitated succinimide was filtered off (G3), and the filtrate was evaporated to dryness. The residue was distilled in vacuum to give 202 g of 2-(bromomethyl)-1,4-difluorobenzene (contaminated with starting 1,4-difluoro-2-methylbenzene), b.p. 110-125° C./100 mbar. On the evidence of NMR spectroscopy, the obtained product included ca. 180 g (87%) of 2-(bromomethyl)-1,4-difluorobenzene. This product was further used without an additional purification.

3-(2,5-Difluorophenyl)propanoyl chloride To a solution of sodium ethoxide obtained from 23.2 g (1.02 mol) of sodium and 800 ml of dry ethanol 328 g (2.04 mol) of diethyl malonate was added. This mixture was stirred for 10 min, and then 2-(bromomethyl)-1,4-difluorobenzene was added dropwise for 2 h. The resulting mixture was refluxed for 4 h, and then ethanol was distilled off. To the residue 500 ml of water was added, and the obtained orange mixture was extracted with 3×200 ml of dichloromethane. The combined extract was dried over $Na_2SO_4$ and then evaporated to dryness. The crude product was distilled under reduced pressure to give 212 g of diethyl 2-(2,5-difluorobenzyl) malonate as a colorless oil, b.p. 88-170° C./7 mbar. To a rapidly stirred mixture of 212 g (0.74 mol) of diethyl 2-(2,5-difluorobenzyl)malonate and 200 ml of ethanol a solution of 125 g (2. mol) of KOH in 200 ml of water was added dropwise. The resulting mixture was refluxed for 5 h, then ethanol was distilled off at atmospheric pressure. The residue was acidified with 12 M HCl, and the precipitate formed was filtered off (G3), washed with water and dried on air. Decarboxilation of this solid at 180° C. gave the respective carbonic acid. A mixture of this acid and 264 g (2.22 mol) of thionyl chloride was stirred overnight at room temperature. An excess of thionyl chloride was distilled off at atmospheric pressure. Vacuum distillation of the residue afforded yellow oil that crystallized at room temperature.

4,7-Difluoroindan-1-one To a suspension of 85.4 g (0.64 mol) of $AlCl_3$ in 600 ml of dichloromethane a solution of 125 g (0.61 mol) of 3-(2,5-difluorophenyl)propanoyl chloride in 100 ml of dichloromethane was added for 30 min at 0° C. This mixture was stirred overnight at room temperature and then poured on 2 kg of crushed ice. The crude product was extracted with 3×200 ml of dichloromethane. The combined organic extract was washed with 200 ml of 1M HCl, 2×200 ml of water, dried over $Na_2SO_4$, and finally evaporated to dryness. The residue was crystallized from ethanol to afford 77.6 g (76%) of the title product as a yellowish solid.

4,7-Difluoro-1H-indene To a solution of 77.6 g (0.46 mol) of 4,7-difluoroindan-1-one in 500 ml of THF 22.6 g (0.60 mol) of $NaBH_4$ was added in one portion. Further on, to this mixture cooled to 0° C. 250 ml of methanol was added dropwise by vigorous stirring for 2 h. The resulting mixture was stirred overnight at room temperature and then evaporated to dryness. After that 0.5 M HCl was added to the residue, and the obtained mixture was thoroughly shaken. Then, the obtained mixture was extracted with 3×300 ml of dichloromethane. The combined organic extract was dried over $Na_2SO_4$ and then evaporated to dryness. The residue was dissolved in 200 ml of toluene, and the obtained solution was evaporated again. Finally, to the residue dissolved in 900 ml of toluene 12.6 g (0.07 mol) of TsOH was added. The obtained solution was refluxed with Dean-Stark trap for 10 min, cooled to room temperature, and then passed through a short layer of silica gel 60 (40-63 um). The filtrate was evaporated to dryness, and the residue was distilled in vacuum to give 49.1 g (70%) of the title product as a colorless liquid, b.p. 48° C./7 mbar.

2-Bromo-4,7-difluoroindan-1-ol To a solution of 49.1 g (0.32 mol) of 4,7-difluoro-1H-indene in a mixture of 350 ml of DMSO 11.5 ml (0.64 mol) of water was added. Then, 59.8 g (0.34 mol) of N-bromosuccinimide was added portionwise for 30 min. After complete addition, the obtained mixture was stirred overnight at room temperature. Further on, 1000 ml of water and 1000 ml of ethyl acetate were added. The organic layer was separated, and the aqueous layer was additionally extracted with 3×150 ml of ethyl acetate. The combined organic extract was washed with 5×500 ml of water, dried over $Na_2SO_4$, and evaporated to dryness. The residue was washed with 300 ml of hexane on glass filter (G3), and the formed precipitate was dried in vacuum. This procedure gave 62.9 g (79%) of the title product as a white powder.

2-Bromo-4,7-difluoro-1H-indene To a solution of 62.9 g (0.25 mol) of 2-bromo-4,7-difluoroindan-1-ol in 500 ml of warm toluene 7.13 g (0.04 mmol) of TsOH was added. The resulting mixture was refluxed with Dean-Stark trap for 70 min, cooled to room temperature, and then passed through a short pad of silica gel 60 (40-63 um). The filtrate was evaporated to dryness, and the residue was distilled in vacuum to give 12.5 g (21%) of 2-bromo-4,7-difluoro-1H-indene as colorless liquid, b.p. 65-70° C./7 mbar.

1,1,4,4,6-Pentamethyl-1,2,3,4-tetrahydronaphthalene. To 1500 ml of 12 M HCl 73.1 g (0.5 mol) of 2,5-dimethylhexane-2,5-diol was added portionwise. The obtained white suspension was stirred for 2 h at room temperature and then poured into 2000 ml of ice water. The resulting mixture was filtered off (G3), and the collected precipitate was washed with water and then dissolved in 700 ml of dichloromethane. The organic layer was separated from the residual water and then dried over $Na_2SO_4$. To the obtained solution of 2,5-dichloro-2,5-dimethylhexane in dichloromethane 150 ml (1.41 mol) of toluene was added, this mixture was stirred for 10 min, and then 5.00 g (0.037 mol) of $AlCl_3$ was added portionwise for 20 min. During this addition a vigorous gas evolution was observed. The resulting mixture was stirred for 15 min and then quenched with 250 ml of cold water. The organic phase was separated and then filtered through a short layer of silica gel 60 (40-63 um). The elute was evaporated to dryness, and the residue was subjected to distillation to give 94.0 g (94%) of the title product as a colorless oil which crystallizes upon cooling, bp 110-140° C./6 mm Hg.

6-(Bromomethyl)-1,1,4,4-tetramethyl-1,2,3,4-tetrahydronaphthalene. A mixture of 264.0 g (1.3 mol) of 1,1,4,4,6-pentamethyl-1,2,3,4-tetrahydronaphthalene, 243.9 g (1.37 mol) of N-bromosuccinimide, and 1.0 g of azobisisobutyronitrile in 1000 ml of tetrachloromethane was refluxed for 4 h. Further on, this mixture was cooled to room temperature, the precipitated succinimide was filtered off (G3), and the filtrate was evaporated to dryness. The residue was distilled in vacuum to give 358.4 g of 6-(bromomethyl)-1,1,4,4-tetramethyl-1,2,3,4-tetrahydronaphthalene contaminated with starting 1,1,4,4,6-pentamethyl-1,2,3,4-tetrahydronaphthalene, b.p. 110-158° C./5 mm Hg. On the evidence of NMR spectroscopy the obtained product included ca. 288 g (79%) of 6-(bromomethyl)-1,1,4,4-tetramethyl-1,2,3,4-tetrahydronaphthalene. This product was further used without an additional purification.

3-(5,5,8,8-Tetramethyl-5,6,7,8-tetrahydronaphthalen-2-yl)propanoic acid. To a solution of sodium ethoxide obtained from 35.2 g (1.53 mol) of sodium and 1000 ml of dry ethanol 408 g (2.55 mol) of diethyl malonate was added. This mixture was stirred for 10 min, and then 6-(bromomethyl)-1,1,4,4-tetramethyl-1,2,3,4-tetrahydronaphthalene (prepared above) was added dropwise for 60 min. The resulting mixture was refluxed for 4 h, and then ethanol was distilled off. To the residue 500 ml of water was added, and the obtained orange mixture was extracted with 3×300 ml of dichloromethane. The combined extract was dried over $Na_2SO_4$ and then evaporated to dryness. The crude product was distilled under reduced pressure to give 315 g (86%) of diethyl [(5,5,8,8-tetramethyl-5,6,7,8-tetrahydronaphthalen-2-yl)methyl]malonate as a colorless oil, b.p. 150-210° C./8 mbar. To a rapidly stirred mixture of 315 g (0.87 mol) of diethyl [(5,5,8,8-tetramethyl-5,6,7,8-tetrahydronaphthalen-2-yl)methyl]malonate and 200 ml of ethanol a solution of 147 g (2.62 mol) of KOH in 200 ml of water was added dropwise. The obtained mixture was refluxed for 4 h to saponificate the ester. Ethanol and water were distilled off until distillation temperature reached 95° C., and then 2000 ml of water and 12 M HCl (to pH 1) were added to the residue. The formed substituted malonic acid was filtered off, washed by 1000 ml of water, and then decarboxylated at 180° C. This procedure gave 224 g (98%) of 3-(5,5,8,8-tetramethyl-5,6,7,8-tetrahydronaphthalen-2-yl)propanoic acid as a brown oil which completely crystallized upon standing at room temperature.

5,5,8,8-Tetramethyl-2,3,5,6,7,8-hexahydro-1H-cyclopenta[b]naphthalen-1-one. A mixture of 224 g of 3-(5,5,8,8-tetramethyl-5,6,7,8-tetrahydronaphthalen-2-yl)propanoic acid and 190 ml (2.61 mol) of thionyl chloride was stirred for 24 h at room temperature. An excess of thionyl chloride was distilled off, and the residue was dried in vacuo. A solution of thus obtained 3-(5,5,8,8-tetramethyl-5,6,7,8-tetrahydronaphthalen-2-yl)propanoyl chloride in 200 ml of dichloromethane was added dropwise to a stirred suspension of 143 g (1.07 mol) of $AlCl_3$ in 900 ml of dichloromethane at 5° C. This mixture was stirred overnight at room temperature and then poured on 2000 g of crushed ice. The organic layer was separated, and the aqueous layer was extracted with 3×250 ml of dichloromethane. The combined organic extract was washed by aqueous $K_2CO_3$, dried over $K_2CO_3$, passed through a short pad of silica gel 60 (40-63 um), and then evaporated to dryness. The residue was recrystallized from 1400 ml of ethanol to give 198 g (95%) of 5,5,8,8-tetramethyl-2,3,5,6,7,8-hexahydro-1H-cyclopenta[b]naphthalen-1-one as a white crystalline solid.

5,5,8,8-Tetramethyl-5,6,7,8-tetrahydro-1H-cyclopenta[b]naphthalene. To a solution of 139 g (0.57 mol) of 5,5,8,8-tetramethyl-2,3,5,6,7,8-hexahydro-1H-cyclopenta[b]naphthalen-1-one in 600 ml of THF 27.0 g (0.71 mol) of $NaBH_4$ was added in one portion. Further on, to this mixture cooled to 0° C. 300 ml of methanol was added dropwise by vigorous stirring for 2 h. The resulting mixture was stirred overnight at room temperature and then evaporated to dryness. After that, 0.5 M HCl was added to the residue, and the obtained mixture was thoroughly shaken. Then, the obtained mixture was extracted with 3×300 ml of dichloromethane. The combined organic extract was dried over $Na_2SO_4$ and then evaporated to dryness. The residue was dissolved in 200 ml of toluene, and the obtained solution was evaporated to dryness again. Finally, to a solution of the residue in 600 ml of toluene 0.6 g of TsOH was added. The obtained solution was refluxed with Dean-Stark trap for 10 min, cooled to room temperature, and then passed through a short layer of silica gel 60 (40-63 um). The filtrate was evaporated to dryness, and the crude product was isolated from the residue by flash chromatography using 400 ml of silica gel 60 (40-63 um) and hexane as eluent to give 113.5 g (88%) of the title product as a white crystalline solid.

2-Bromo-5,5,8,8-tetramethyl-2,3,5,6,7,8-hexahydro-1H-cyclopenta[b]naphthalen-1-ol. To a solution of 113.5 g (0.5 mol) of 5,5,8,8-tetramethyl-5,6,7,8-tetrahydro-1H-cyclopenta[b]naphthalene in a mixture of 1000 ml of DMSO and 500 ml of THF 18 ml (1.0 mol) of water was added. Then, 93.8 g (0.53 mol) of N-bromosuccinimide was added portionwise for 30 min. After complete addition, the obtained mixture was stirred overnight at room temperature. Further on, 1000 ml of water and 1000 ml of ethyl acetate were added. The organic layer was separated, and the aqueous layer was additionally extracted with 3×150 ml of ethyl acetate. The combined organic extract was washed with 5×500 ml of water, dried over $Na_2SO_4$, and then evaporated to dryness. The residue was washed with 300 ml of hexane on glass filter (G3), and the obtained precipitate was dried in vacuum. This procedure gave 155 g (95%) of the title product as a white powder.

2-Bromo-5,5,8,8-tetramethyl-5,6,7,8-tetrahydro-1H-cyclopenta[b]naphthalene. To a solution of 155 g (0.48 mol) of 2-bromo-5,5,8,8-tetramethyl-2,3,5,6,7,8-hexahydro-1H-cyclopenta[b]naphthalen-1-ol in 1000 ml of warm toluene 9.41 g (48 mmol) of TsOH was added. The resulting mixture was refluxed with Dean-Stark trap for 10 min, cooled to room temperature, and then passed through a short pad of silica gel 60 (40-63 um). The filtrate was evaporated to dryness, and the residue was purified by flash chromatography on silica gel 60 (40-63 um, eluent: hexane) to give 113.5 g (85%) of the title product as a white crystalline solid.

3-(2-Bromophenyl)-indan-1-one In a flask equipped with a mechanical stirrer, to polyphosphoric acid prepared from 1250 g of $P_4O_{10}$ and 1000 ml of $H_3PO_4$ (85%) 129 g (0.45 mol) of 3-(2-bromophenyl)-1-phenylprop-2-en-1-one was added dropwise for 10 min at 140° C. The formed mixture was stirred for 40 min, then poured into 2 L of ice-cold water. The crude product was extracted with 3×500 ml of dichloromethane. The combined organic extract was washed with aqueous $K_2CO_3$, dried over $Na_2SO_4$, and then evaporated to dryness. The residue was subjected to flash chromatography using 1500 ml of silica gel 60 (40-653 um) and a ca. 10 to 1 (vol.) mixture of hexane and ethyl acetate as eluent to give 43 g (33%) of the title product as a yellowish solid.

1-(2-Bromophenyl)-1H-indene To a solution of 131 g (0.46 mol) of 3-(2-bromophenyl)-indan-1-one in 500 ml of THF 22.4 g (0.59 mol) of $NaBH_4$ was added in one portion. Further on, to this mixture cooled to 0° C. 250 ml of methanol was added dropwise by vigorous stirring for 2 h. The resulting mixture was stirred overnight at room temperature and then evaporated to dryness. After that, 0.5 M HCl was added to the residue, and the obtained mixture was thoroughly shaken. Further on, the obtained mixture was extracted with 3×300 ml of dichloromethane. The combined organic extract was dried over $Na_2SO_4$ and then evaporated to dryness. The residue was dissolved in 200 ml of toluene, and the obtained solution was evaporated to dryness again. Finally, to the residue dissolved in 1200 ml of toluene 1.0 g of TsOH was added. The obtained solution was refluxed with Dean-Stark trap for 30 min, cooled to room temperature, and then passed through a short layer of silica gel 60 (40-63 um). The filtrate was evaporated to dryness, and the crude product was isolated from the residue by flash chromatography using 400 ml of silica gel 60 (40-63 um) and hexane as eluent to give 102.0 g (82%) of the title product as a white crystalline solid.

3-(2-Bromophenyl)-2-methyl-1-phenylprop-2-ene-1-one NaOH (11.6 g, 290 mmol, 1.3 equiv.) was dissolved in a mixture of 100 ml of ethanol and 200 ml of water. This solution was cooled to room temperature, and propiophenone (30.0 g, 224 mmol, 1 equiv.) was added in one portion. Further on, 2-bromobenzaldehyde (41.4 g, 224 mmol, 1 equiv) was added in one portion, and the resulting mixture was stirred overnight at room temperature and then for 12 h at 60° C. The reaction mixture was poured into 1000 ml of water and extracted with diethyl ether (3×150 ml). The combined organic extract was dried over $Na_2SO_4$ and, finally, evaporated to dryness in vacuum. The residue was distilled in vacuum, b.p. 135-155° C./1 mbar. This procedure afforded 45.8 g (66%) of the title compound (contained with ca. 5 mol. % of propiophenone according to NMR) as a greenish oil. It was used without further purification.

3-(2-Bromophenyl)-2-methyl-2,3-dihydro-1H-inden-1-one 3-(2-Bromophenyl)-2-methyl-1-phenylprop-2-ene-1-one (57.4 g, 190 mmol) was added in one portion to the polyphosphoric acid (prepared from 500 ml of 85% phosphoric acid and 150 g of $P_4O_{10}$). The mixture was stirred at 140° C. for 1 h and then poured in 3000 ml of water. The crude product was extracted with diethyl ether (3×300 ml). The combined organic extract was dried over $Na_2SO_4$ and then evaporated to dryness. The remaining propiophenone and all other volatiles were removed by Kugelrohr distillation. This procedure afforded 34.0 g (59%) of the title compound as a red oil. The product was a mixture of two diastereomers, A and B, in ratio of about 4:1 according to NMR.

1-(2-Bromophenyl)-2-methyl-1H-indene 3-(2-Bromophenyl)-2-methyl-2,3-dihydro-1H-inden-1-one (34.0 g, 113 mmol) was dissolved in a mixture of 400 ml of THF and 100 ml of methanol. $NaBH_4$ (6.40 g, 170 mmol, 1.5 equiv.) was added in small portions to this solution. After completion of addition, the reaction mixture was stirred overnight at room temperature and then poured into 1500 ml of water. The product was extracted with diethyl ether (3×100 ml). The combined organic extract was washed with water, dried over $Na_2SO_4$ and then evaporated to dryness. The residue was dissolved in 500 ml of toluene, and catalytic amount of TsOH was added. The resulting mixture was refluxed using Dean-Stark head for 10 min, cooled to room temperature, and then passed through a short pad of silica gel 60 (40-63 um). The solvent was evaporated, the residue was redissolved in hexane, and the obtained solution was passed through a short pad of silica gel 60 (40-63 um). The resulting solution was evaporated to dryness. This procedure afforded 25.0 g (78%) of the title compound as a white solid.

(4-(2-Bromophenyl)cyclopenta-1,3-diene-1,2-diyl)dibenzene A solution of iPrMgCl*LiCl in THF (0.935 M, 75.6 ml, 70 mmol) was added dropwise to a solution of 2-bromoiodobenzene (20 g, 70 mmol) in THF (100 ml) at −40° C. This mixture was stirred for 1 h at −40° C. Further on, a solution of 3,4-diphenylcyclopent-2-en-1-one (16.5 g, 70 mmol) in THF (50 ml) was added dropwise at −40° C. Next, the reaction mixture was stirred for an additional hour at −30° C., then warmed up to room temperature, and, finally, stirred overnight at this temperature. After that, the formed mixture was poured into water, and the crude product was extracted with diethyl ether (3×100 ml). The organic layer was collected, dried over $Na_2SO_4$, and then evaporated to dryness. To a solution of the residue in THF (50 ml) 10% $H_2SO_4$ (10 ml) was added. After 10 min of vigorous stirring, water (100 ml) was added, and the crude product was extracted with hexanes (3×50 ml). The combined extract was dried over $Na_2SO_4$ and then evaporated to dryness. The product was isolated via column chromatography on silica in hexanes giving 8.7 g (34%) of a yellow oil.

2-Bromo-6-(tert-butyl)-4-fluorophenol A solution of NBS (11.4 g, 96.3 mmol) in dichloromethane (400 ml) was added dropwise to a solution of diisopropylamine (1.3 ml, 9.6 mmol) and 2-tert-butyl-4-fluorophenol (16.2 g, 96.3 mmol) in dichloromethane (400 ml) at room temperature. The reaction mixture was stirred overnight at room temperature. Next, this mixture was poured into water, and the organic layer was separated. The aqueous layer was extracted with dichloromethane (2×100 ml). The combined extract was evaporated to dryness, and the product was isolated via flash-chromatography on silica gel 60 (40-63 um) using hexanes as eluent to give 15.02 g (64%) of the title product as a colorless oil.

1-Bromo-3-(tert-butyl)-5-fluoro-2-(methoxymethoxy) benzene 2-Bromo-6-(tert-butyl)-4-fluorophenol (14.5 g, 58.6 mmol) was added in small portions to NaH (60% dispersion in mineral oil, 3.0 g, 76.2 mmol) in THF (200 ml) at 0° C. Further on, this mixture was warmed to room temperature for 30 min. After that, this mixture was cooled to 0° C., and MOMCl (5.7 g, 70.3 mmol) was added dropwise. The reaction mixture was stirred overnight at room temperature, then poured into cold water, and the organic layer was separated. The aqueous layer was extracted with ether (2×100 ml). The organic layer was separated and then evaporated using rotary evaporator. The product was isolated by flash-chromatography on silica gel 60 (40-63 um; eluent: hexane) giving 16.0 g (94%) of a colorless oil.

1-Bromo-3-(tert-butyl)-5-methoxy-2-(methoxymethoxy) benzene 2-Bromo-4-methoxy-6-tert-butylphenol (11.9 g, 46.1 mmol) was added by portions to NaH (60% in mineral oil, 2.4 g, 59.9 mmol) in THF (150 ml) at 0° C. Further on, this mixture was warmed up for 30 min to room temperature. After that, this mixture was cooled to 0° C., and MOMCl (4.5 g, 55.3 mmol) was added dropwise. The reaction mixture was stirred overnight at room temperature, then poured into water, and the organic layer was separated. The aqueous layer was extracted with ether (2×100 ml). The combined organic extract was evaporated to dryness. The product was isolated by flash-chromatography in silica gel 60 (40-63 um; eluent: hexane) giving 9.95 g (71%) of a colorless oil.

2-(Methoxymethoxy)-1,1'-biphenyl To a solution of 17.4 g (0.081 mol) of 2-(methoxymethoxy)-1,1'-biphenyl in 600 ml of ether 65.1 ml (0.163 mol) of 2.5 M $^n$BuLi was added at 0° C. The resulting mixture was stirred overnight at room temperature. Then, 45.2 g (0.243 mol) of 2-isopropoxy-4,4, 5,5-tetramethyl-1,3,2-dioxaborolane was added at −80° C. After that, the cooling bath was removed, and the resulting mixture was stirred for 1 h at room temperature. Finally, 200 ml of water was added, the organic layer was separated, and the aqueous layer was extracted with ether (3×50 ml). The combined organic extract was dried over $Na_2SO_4$ and then evaporated to dryness to give 25.3 g (92%) of the title product as a white solid.

2-(3-(tert-Butyl)-5-fluoro-2-(methoxymethoxy)phenyl)-4,4,5,5-tetramethyl-1,3,2-dioxaborolane nBuLi (2.45 M in hexanes, 22.3 ml, 54.9 mmol) was added drop wise to the solution of 1-bromo-3-(tert-butyl)-5-fluoro-2-(methoxymethoxy)benzene (16 g, 54.9 mmol) in anhydrous THF (300 ml) at −78° C. The resulting solution was stirred for 1 h at this temperature. Further on, iPrOBPin (12.3 g, 65.9 mmol) was added in one portion, and the reaction mixture was stirred overnight at room temperature. Next, water was added to the solution, and the organic layer was separated. The aqueous layer was extracted with dichloromethane (2×100 ml). The combined organic extract was evaporated to dryness. The title product was isolated by flash-chromatography on silica gel 60 (40-63 um; eluent: hexane-dichloromethane=10:1, vol.) giving 16.58 g (89%) of a yellow oil.

2-(3-(tert-Butyl)-5-methoxy-2-(methoxymethoxy)phenyl)-4,4,5,5-tetramethyl-1,3,2-dioxaborolane nBuLi (2.45 M in hexanes, 13.34 ml, 32.7 mmol) was added dropwise to a solution of 1-bromo-3-(tert-butyl)-5-methoxy-2-(methoxymethoxy)benzene (9.9 g, 32.7 mmol) in THF (200 ml) at −78° C. The resulting solution was stirred at this temperature for 1 h. Then, iPrOBPin (7.3 g, 39.2 mmol) was added in one portion, and the reaction mixture was stirred overnight at room temperature. Next, water was added, the organic layer was separated. The aqueous layer was extracted with dichloromethane (2×100 ml). The combined organic extract was evaporated to dryness. The title product was isolated by flash-chromatography on silica gel 60 (40-63 um; eluent: hexanes-dichloromethane=10:1, vol.) giving 9.8 g (86%) of yellow crystals.

2-(2-(Allyloxy)-3-(tert-butyl)-5-methylphenyl)-4,4,5,5-tetramethyl-1,3,2-dioxaborolane nBuLi (2.45 M in hexanes, 35.4 ml, 86.7 mmol) was added drop wise to the solution of 2-(allyloxy)-1-bromo-3-(tert-butyl)-5-methylbenzene (24.6 g, 86.7 mmol) in anhydrous THF 500 ml) at −78° C. The resulting solution was stirred at this temperature for 1 h. Then, iPrOBPin (19.3 g, 104.0 mmol) was added in one portion, and the reaction mixture was stirred overnight at room temperature. Next, water was added, and the organic layer was separated. The aqueous layer was extracted with dichloromethane (2×100 ml). The combined organic extract was evaporated to dryness. The title product was isolated by recrystallization of the residue from methanol giving 20.4 g (72%) of yellowish crystals.

General Procedure A for Synthesis of Substituted 2-indenyl-4,4,5,5-tetramethyl-1,3,2-dioxaborolanes Palladium chloride (0.55 g, 3.1 mmol, 0.05 eq.) was added to a solution of $Ph_3P$ (1.64 g, 6.2 mmol, 0.1 equiv.) in THF (500 ml). This mixture was stirred at 50° C. until complete dissolution of $PdCl_2$. Then, dry potassium acetate (18.3 g, 187.2 mmol, 3.0 equivs.), substituted 2-bromo-1H-indene (62.4 mmol, 1.0 equiv.), and 4,4,4',4',5,5,5',5'-octamethyl-2,2'-bi-1,3,2-dioxaborolane (17.4 g, 69.0 mmol, 1.1 equiv.) were added. The reaction mixture was stirred for two days at 50° C. The formed precipitate was filtered off (G3), washed with diethyl ether, and the resulting solution was evaporated to dryness. The product was isolated as a white solid from the residue by flash-chromatography on silica gel 60 (40-63 um; eluent: hexane-dichloromethane=10:1, vol.).

Compounds produced via general procedure A: 2-(1H-Inden-2-yl)-4,4,5,5-tetramethyl-1,3,2-dioxaborolane (I2), 2-(4,7-Dimethyl-1H-inden-2-yl)-4,4,5,5-tetramethyl-1,3,2-dioxaborolane (I5), 2-(1/3H-Cyclopenta[a]naphthalen-2-yl)-4,4,5,5-tetramethyl-1,3,2-dioxaborolanes (I6)

General Procedure B for Synthesis of Substituted 2-(2-bromophenyl)-1H-indenes Substituted 2-indenyl-4,4,5,5-tetramethyl-1,3,2-dioxaborolanes (50 mmol, 1.0 equiv.) was dissolved in 1,4-dioxane (450 ml) in a pressure vessel, then, 2-bromoiodobenzene (14.15 g, 50 mmol, 1.0 equiv.) and 2.0 M aqueous $Cs_2CO_3$ (75 ml, 150 mmol, 3.0 equivs.) were added. This pressure vessel was purged with argon for 10 min, $Pd(PPh_3)_4$ (4.62 g, 4.0 mmol, 0.08 equiv.) was added, and the pressure vessel was tightly closed. The reaction was stirred for 24 h at 100° C., then the volatiles were removed in vacuum, and the residue was extracted with dichloromethane. The organic layer was dried over $Na_2SO_4$ and then evaporated to dryness. The product was isolated by flash-chromatography on silica gel 60 (40-63 um; eluent: hexane-dichloromethane=10:1, vol.).

Compounds produced via general procedure B: 2-(2-Bromophenyl)-1H-indene (I7), 2-(2-Bromophenyl)-4,7-dimethyl-1H-indene (I8), 2-(2-Bromophenyl)-1/3H-cyclopenta[a]naphthalenes (I9).

General Procedure C for Syntheses of Substituted 2-[2-(indenyl)phenyl]-4,4,5,5-tetramethyl-1,3,2-dioxaborolanes Palladium chloride (0.55 g, 3.1 mmol, 0.05 equiv.) was added to a solution of $Ph_3P$ (1.64 g, 6.2 mmol, 0.1 equiv.) in THF (500 ml). This mixture was stirred at 50° C. until complete dissolution of $PdCl_2$. Then, dry potassium acetate (18.3 g, 187.2 mmol, 3.0 equivs.), substituted 2-(2-bromophenyl)-1H-indene (62.4 mmol, 1.0 equiv.), and 4,4,4',4',5,5,5',5'-octamethyl-2,2'-bi-1,3,2-dioxaborolane (17.4 g, 69.0 mmol, 1.1 equiv.) were added. The reaction mixture was stirred for two days at 50° C. Further on, the formed precipitate was filtered off (G3), washed with diethyl ether, and resulting the solution was evaporated to dryness. The product was isolated from the residue by flash-chromatography on silica gel 60 (40-63 um; eluent: hexane-dichloromethane=10:1, vol.).

Compounds produced via general procedure C: 2-[2-(1H-Inden-2-yl)phenyl]-4,4,5,5-tetramethyl-1,3,2-dioxaborolane (I10), 2-[2-(4,7-Dimethyl-1H-inden-2-yl)phenyl]-4,4,5,5-tetramethyl-1,3,2-dioxaborolane (I11), 2-[2-(1/3H-Cyclopenta[a]naphthalen-2-yl)phenyl]-4,4,5,5-tetramethyl-1,3,2-dioxaborolanes (I12).

General Procedure D for Palladium-Catalysed Suzuki Cross-Coupling of aryl- or indenyl-4,4,5,5-tetramethyl-1,3,2-dioxaborolanes and 2-bromo-4,6-di-tert-butylphenol Aryl- or indenyl-4,4,5,5-tetramethyl-1,3,2-dioxaborolane (6.69 mmol, 1.0 equiv.) and 2-bromo-4,6-di-tert-butylphenol (1.91 g, 6.69 mmol, 1.0 eq.) were dissolved in 1,4-dioxane (70 ml) in a pressure vessel. Further on, 2.0 M $Cs_2CO_3$ was added (10 ml, 20.0 mmol), and the formed mixture was purged with argon for 5 min. Next, $Pd(PPh_3)_4$ (380 mg, 0.334 mmol, 0.05 eq.) was added, and the pressure vessel was tightly closed. The reaction mixture was stirred for 16 h at 100° C., then evaporated to dryness, and 300 ml of water was added. The crude product was extracted with dichloromethane (2×100 ml). The organic layer was separated, dried under $Na_2SO_4$, and then evaporated to dryness. The title product was isolated by flash-chromatography on silica gel 60*40-63 um; eluent: hexane-ethyl acetate=10:1, vol.).

Compounds produced via general procedure D: 2,4-Di-tert-butyl-6-(1H-inden-2-yl)phenol (O1), 3,5-Di-tert-butyl-2'-(1H-inden-2-yl)-[1,1'-biphenyl]-2-ol (O3), 3,5-Di-tert-butyl-2'-(4,7-dimethyl-1H-inden-2-yl)-[1,1'-biphenyl]-2-ol (O4), 3,5-Di-tert-butyl-2'-(1H-cyclopenta[a]naphthalen-2-yl)-[1,1'-biphenyl]-2-ol (O5)

General Procedure E for Synthesis of indenyl-phenoxy titanium dichlorides

The proligand (1.26 mmol) was dissolved in toluene (50 ml), and tetrakis(dimethylamido)titanium (297 μl, 1.26 mmol) was added at room temperature. This mixture was stirred for 16 h at 100° C. and then evaporated to dryness. To a solution of the residue in toluene (50 ml) dimethyldichlorosilane (0.8 ml, 6.3 mmol) was added at room temperature. The resulting solution was stirred for 16 h at 50° C., then cooled to room temperature and passed through a short pad of Celite. The filtrate was evaporated to dryness, the residue was washed with hot hexane (50 ml), and thus obtained suspension was filtered off (G4). The precipitate was dried in vacuum to give orange-brown solid product.

Compounds produced via general procedure E: C-3, I-1, I-2, I-3, I-5, I-6, I-7, I-8

General Procedure F for Syntheses of Substituted 2'-(1H-inden-2-yl)biphenyl-2-ols from 2-(2-(methoxymethoxy)phenyl)-4,4,5,5-tetramethyl-1,3,2-dioxaborolanes and 2-(2-bromophenyl)-4,7-dimethyl-1H-indene To a solution of 2-(2-(methoxymethoxy)-[1,1'-biphenyl]-3-yl)-4,4,5,5-tetramethyl-1,3,2-dioxaborolane (7.00 mmol) in 100 ml of 1,4-dioxane 2-(2-bromophenyl)-4,7-dimethyl-1H-indene (2.10 g, 7.00 mmol), cesium carbonate (6.84 g, 21.0 mmol), and 50 ml of water were subsequently added. The mixture obtained was purged with argon for 10 min followed by addition of $Pd(PPh_3)_4$ (0.40 g, 0.35 mmol). This mixture was stirred for 12 h at 100° C., then cooled to room temperature, and diluted with 50 ml of water. The obtained mixture was extracted with dichloromethane (3×100 ml), the combined organic extract was dried over $Na_2SO_4$ and then evaporated to dryness. The residue can be additionally purified by flash-chromatography to isolate MOM-protected proligand or used as it is. To a solution of the crude proligand (7.0 mmol) in 50 ml of THF 50 ml of methanol and 1 ml of 12N HCl were subsequently added. The reaction mixture was stirred overnight at 60° C. and then poured into 200 ml of water. The obtained mixture was extracted with dichloromethane (3×50 ml), the combined organic extract was dried over $Na_2SO_4$ and then evaporated to dryness. The residue was purified by flash chromatography on silica gel 60 (40-63 um, eluent: hexane-dichloromethane=10:1, vol.).

Compounds produced via general procedure F: 2-(4,7-Dimethyl-1H-inden-2-yl)-[1,1':3',1"-terphenyl]-2'-ol (O15), 2-(3'-(tert-Butyl)-5'-fluoro-2'-(methoxymethoxy)-[1,1'-biphenyl]-2-yl)-4,7-dimethyl-1H-indene (O13), 3-(Tert-butyl)-2'-(4,7-dimethyl-1H-inden-2-yl)-5-fluoro-[1,1'-biphenyl]-2-ol (O16), 2-(3'-(Tert-butyl)-5'-methoxy-2'-(methoxymethoxy)-[1,1'-biphenyl]-2-yl)-4,7-dimethyl-1H-indene (O14), 3-(Tert-butyl)-2'-(4,7-dimethyl-1H-inden-2-yl)-5-methoxy-[1,1'-biphenyl]-2-ol (O17).

General Procedure G for Syntheses of Substituted 2-bromo-2'-(methoxymethoxy)biphenyls To a solution of 23.6 g (83.4 mmol) of 1-bromo-2-iodobenzene in 700 ml of 1,4-dioxane substituted 2-(2-(methoxymethoxy)phenyl)-4,4,5,5-tetramethyl-1,3,2-dioxaborolane (83.4 mmol), 81.6 g (250 mmol) of cesium carbonate, and 350 ml of water were subsequently added. The obtained mixture was purged with argon for 10 min followed by an addition of 4.82 g (4.17 mmol) of $Pd(PPh_3)_4$. This mixture was stirred for 12 h at 100° C., then cooled to room temperature. To the obtained two-phase mixture 1000 ml of diethyl ether was added. The organic layer was separated, washed with brine, dried over $Na_2SO_4$, and then evaporated to dryness. The residue was purified by flash chromatography on silica gel 60 (40-63 um, eluent: hexane-dichloromethane=5:1, vol.).

Compounds produced via general procedure G: 2'-Bromo-3,5-di-tert-butyl-2-(methoxymethoxy)-1,1'-biphenyl (O20), 2'-Bromo-3-9H-carbazol-9-yl-2-(methoxymethoxy)-5-methyl-1,1'-biphenyl (O21).

General Procedure H for Syntheses of Substituted 2-[2'-(methoxymethoxy)biphenyl-2-yl]-4,4,5,5-tetramethyl-1,3,2-dioxaborolanes nBuLi (2.45 M in hexanes, 13.34 ml, 32.7 mmol) was added dropwise to the solution of substituted 2-bromo-2'-(methoxymethoxy)biphenyl (32.7 mmol) in 200 ml of THF at −78° C. The resulting solution was stirred for 1 h at this temperature. Further on, iPrOBPin (7.3 g, 39.2 mmol) was added in one portion, and the reaction mixture was stirred overnight at room temperature. Next, water was added, and the organic layer was separated. The aqueous layer was extracted with diethyl ether (2×100 ml). The combined organic extract dried over $Na_2SO_4$ and then evaporated to dryness. The product was purified by flash-chromatography on silica gel 60 (40-63 um; eluent: hexane-dichloromethane=10:1, vol.).

Compounds produced via general procedure H: 2-[3',5'-Di-tert-butyl-2'-(methoxymethoxy)biphenyl-2-yl]-4,4,5,5-tetramethyl-1,3,2-dioxaborolane (O22), 4-(9H-Carbazol-9-yl)-2-methyl-6H-dibenzo[c,e][1,2]oxaborinin-6-ol (O23).

General Procedure I for Syntheses of Substituted 2'-(1H-inden-2-yl)biphenyl-2-ols from 2-[2'-(methoxymethoxy)biphenyl-2-yl]-4,4,5,5-tetramethyl-1,3,2-dioxaborolanes and 2-bromo-1H-indene To a solution of substituted 2-(2'-(methoxymethoxy)-[1,1'-biphenyl]-2-yl)-4,4,5,5-tetramethyl-1,3,2-dioxaborolane (8.84 mmol) in 100 ml of 1,4-dioxane substituted 2-bromo-1H-indene (2.33 g, 8.84 mmol), cesium carbonate (8.60 g, 26.4 mmol), and 50 ml of water were subsequently added. The mixture obtained was purged with argon for 10 min followed by addition of $Pd(PPh_3)_4$ (0.51 g, 0.442 mmol). This mixture was stirred for 12 h at 100° C., then cooled to room temperature, and diluted with 50 ml of water. The obtained mixture was extracted with dichloromethane (3×100 ml), the combined organic extract was dried over $Na_2SO_4$ and then evaporated to dryness. To the resulting oil 50 ml of THF, 50 ml of methanol and 1 ml of 12N HCl were subsequently added. The reaction mixture was stirred overnight at 60° C. and then poured into 200 ml of water. The obtained mixture was extracted with dichloromethane (3×50 ml), the combined organic extract was dried over $Na_2SO_4$ and then evaporated to dryness. The product was purified by flash chromatography on silica gel 60 (40-63 um, eluent: hexane-dichloromethane=10:1, vol.).

Compounds produced via general procedure I: 3,5-Di-tert-butyl-2'-(5,6-dimethyl-1H-inden-2-yl)-[1,1'-biphenyl]-2-ol (O29), 3,5-Di-tert-butyl-2'-(4,8-dimethyl-1,5,6,7-tetrahydro-s-indacen-2-yl)biphenyl-2-ol (O30), 3,5-Di-tert-butyl-2'-(5,5,8,8-tetramethyl-5,6,7,8-tetrahydro-1H-cyclopenta[b]naphthalen-2-yl)biphenyl-2-ol (O31), 3,5-Di-tert-butyl-2'-(4,7-difluoro-1H-inden-2-yl)-[1,1'-biphenyl]-2-ol (O32), 3-(9H-Carbazol-9-yl)-2'-(4,7-dimethyl-1H-inden-2-yl)-5-methylbiphenyl-2-ol (O33).

3-Tert-butyl-2'-(1H-inden-1-yl)-5-methyl-biphenyl-2-ol (O34) A mixture of 3.0 g (9.1 mmol) of 2-[2-(allyloxy)-3-tert-butyl-5-methylphenyl]-4,4,5,5-tetramethyl-1,3,2-dioxaborolane, 2.46 g (9.1 mmol) of 1-(2-bromophenyl)-1H-indene dissolved, 14 ml of 2 M $Cs_2CO_3$ (27.3 mmol), and 80 ml 1,4-dioxane was charged into a high-pressure vessel. This mixture was purged with inert gas for 5 min, and then 0.840 g (0.73 mmol) of $Pd(PPh_3)_4$ was added. The obtained mixture was stirred for 16 h at 100° C., then evaporated to dryness, and water (100 ml) and dichloromethane (100 ml) were added to the residue. The organic layer was collected, and the aqueous layer was extracted with dichloromethane (2×50 ml). The combined organic extract was dried over $Na_2SO_4$ and then evaporated to dryness. The product was isolated by flash-chromatography on silica gel 60 (40-63 um; eluent: hexane-dichloromethane=10:1, vol.). Yield: 1.95 g (54%).

3,5-Di-tert-butyl-2-(methoxymethoxy)-2'-(2-methyl-1H-inden-1-yl)biphenyl (O35): A mixture of 3.0 g (9.0 mmol) of 2-[2-(allyloxy)-3,5-di-tert-butylphenyl]-4,4,5,5-tetramethyl-1,3,2-dioxaborolane, 2.56 g (9.0 mmol) of 1-(2-bromophenyl)-2-methyl-1H-indene, 13.5 ml of 2 M $Cs_2CO_3$ (27.0 mmol), and 80 ml of 1,4-dioxane was charged into a high-pressure vessel. This mixture was purged with inert gas for 5 min, and then 0.83 g (0.72 mmol) of $Pd(PPh_3)_4$ was added. The obtained mixture was stirred for 16 h at 100° C. and then evaporated to dryness. To the residue water (100 ml) and dichloromethane (100 ml) were added. The organic layer was collected, and the aqueous layer was extracted with dichloromethane (2×50 ml). The combined organic extract was dried over $Na_2SO_4$ and then evaporated to dryness. The product was isolated by flash-chromatography on silica gel 60 (40-63 um; eluent: Hexane-dichloromethane=10:1, vol.). Yield: 3.5 g (95%).

3,5-Di-tert-butyl-2'-(2-methyl-1H-inden-1-yl)biphenyl-2-ol (O36): To the above-obtained oil of O34 150 ml of THF, 150 ml of methanol and 3 ml of 12N HCl were subsequently added. The reaction mixture was stirred overnight at 60° C. and then poured into 200 ml of water. The crude product was extracted with dichloromethane (3×50 ml), the combined organic extract was dried over $Na_2SO_4$ and then evaporated to dryness. The product was isolated by flash chromatography on silica gel 60 (40-63 um, eluent: hexane-dichloromethane=10:1, vol.). Yield: 2.4 g (72%).

2-(Allyloxy)-3-(tert-butyl)-2'-(3,4-diphenylcyclopenta-1,3-dien-1-yl)-5-methyl-1,1'-biphenyl (O37): A mixture of 1.77 g (5.4 mmol) of 2-[2-(allyloxy)-3-tert-butyl-5-methylphenyl]-4,4,5,5-tetramethyl-1,3,2-dioxaborolane, 2.0 g (5.4 mmol) of 1-bromo-2-(3,4-diphenylcyclopenta-1,3-dien-1-yl)benzene, 8.1 ml of 2.0 M $Cs_2CO_3$ (16.2 mmol), and 48 ml of 1,4-dioxane was charged into a high-pressure vessel. This mixture was purged with inert gas for 5 min, and then 0.50 g (0.43 mmol) of $Pd(PPh_3)_4$ was added. The obtained mixture was stirred for 16 h at 100° C., then evaporated to dryness, and 100 ml of water and 100 ml of dichloromethane were added to the residue. The organic layer was separated, and the aqueous layer was extracted with dichloromethane (2×50 ml). The combined organic extract was dried over $Na_2SO_4$ and then evaporated to dryness. The product was isolated by flash chromatography on silica gel 60 (40-63 um; eluent: hexane-dichloromethane=10:1, vol.).

I-4: $^n$BuLi in hexanes (5.2 ml, 2.5 M, 12.8 mmol) was added to a solution of proligand O36 (2.35 g, 6.4 mmol) in 60 mL of THF at −78° C. This mixture was allowed to warm to room temperature, then stirred for 2 h, then cooled to −78° C., and $Ti(NMe_2)_2Cl_2$ (1.32 g, 6.4 mmol) was added in one portion. The resulting mixture was slowly warmed to room temperature by vigorous stirring and then evaporated to dryness. The residue was extracted with hot toluene, and insoluble materials were removed by filtration through a layer of Celite. Dimethyldichlorosilane (3.9 ml, 32.0 mmol) was added to the filtrate at room temperature, and the resulting mixture was stirred for 16 h at 50° C. The formed mixture was cooled to room temperature and passed through a short pad of Celite. The filtrate was evaporated to dryness, and the residue was triturated in hot hexane (50 ml), and the formed precipitate was filtered off (G4) and then dried in vacuum. Yield: 1.65 g (53%) of a dark brown powder.

I-9: $^n$BuLi in hexanes (2.5 M, 1.24 ml, 3.10 mmol) was added to a solution of triethylamine (0.884 ml, 6.34 mmol) and the allyl-protected proligand, O37 (700 mg, 1.41 mmol) in 50 mL of toluene at −78° C. This mixture was allowed to warm to room temperature and then stirred for 20 h. Further on, $Ti(NMe_2)_2Cl_2$ (306 mg, 1.48 mmol) was added in one portion to this mixture at −78° C. The resulting mixture was warmed to room temperature, then heated to 90° C., and stirred for 16 h at this temperature. After cooling to room temperature, this mixture was evaporated to dryness. The residue was extracted with hot toluene, and insoluble material was removed by filtration through a layer of Celite. Further on, dimethyldichlorosilane (0.86 ml, 7.05 mmol) was added to the filtrate at room temperature, and the resulting solution was stirred for 16 h at 50° C. The obtained mixture was cooled to room temperature and then filtered through a short pad of Celite. The filtrate was evaporated to dryness, and the residue was triturated in 50 mL of hot hexane. The precipitate was filtered off (G3), washed by small amount of cold hexane, and fried in vacuum. Yield: 0.51 g (68%) of a dark brown-orange powder.

Syntheses of amido-metallocenes

2-Bromo-1H-indene [*Polyhedron* 2017, 126, 72-82], 2-bromo-N,4-dimethylaniline [*Org. Lett.* 2017, 19(19), 5038-5041], 2-bromo-N-isopropyl-4-methylaniline [*Chem. Sci.* 2017, 8(2), 1344-1349], and 2-bromo-4-methyl-N-phenylaniline [*Chem. Comm.* 2016, 52(6), 1170-1173] were obtained as described in the literature.

2-Bromo-N-(tert-butyl)-4-methylaniline: To a solution of 17.4 g (0.107 mmol) of N-(tert-butyl)-4-methylaniline in 100 ml of DMF a solution of 18.7 g (0.105 mol) of N-bromosuccinimide in 100 ml of DMF was added dropwise at 0° C. The reaction mixture was stirred overnight at room temperature and then poured into 500 ml of water. The obtained mixture was extracted with ether (3×100 ml). The combined organic extract was washed with water (3×200 ml), dried over $Na_2SO_4$, and then evaporated to dryness. The residue was distilled in vacuum to give 20.2 g (78%) of the title product as a colorless oil, b.p. 100-105° C./1 mbar.

2'-(1H-inden-2-yl)-N-methyl-5-methylbiphenyl-2-amine (N1): To a solution of 3.00 g (9.43 mmol) of 2-(2-(1H-inden-2-yl)phenyl)-4,4,5,5-tetramethyl-1,3,2-dioxaborolane in 100 ml of 1,4-dioxane 1.89 g (9.43 mmol) of 2-bromo-N,4-dimethylaniline, 9.22 g (28.3 mmol) of cesium carbonate, 50 ml of water were subsequently added. This mixture was purged with argon for 10 min followed by addition of 0.44 g (0.38 mmol) of $Pd(PPh_3)_4$. The obtained mixture was stirred for 12 h at 90° C., then cooled to room temperature, and diluted with 50 ml of water. The crude product was extracted with dichloromethane (3×100 ml), the combined organic extract was dried over $Na_2SO_4$ and then evaporated to dryness. The product was purified by flash chromatography on silica gel 60 (40-63 um, eluent: hexane-ethyl acetate=10:1, vol.). Yield 2.30 g (78%) of a white solid.

2'-(1H-Inden-2-yl)-N-isopropyl-5-methylbiphenyl-2-amine (N2): To a solution of 3.00 g (9.43 mmol) of 2-(2-(1H-inden-2-yl)phenyl)-4,4,5,5-tetramethyl-1,3,2-dioxaborolane in 100 ml of 1,4-dioxane 2.15 g (9.43 mmol) of 2-bromo-N-isopropyl-4-methylaniline, 9.22 g (28.3 mmol) of cesium carbonate, 50 ml of water were subsequently added. This mixture was purged with argon for 10 min followed by addition of 0.44 g (0.38 mmol) of $Pd(PPh_3)_4$. The obtained mixture was stirred for 12 h at 90° C., then cooled to room temperature, and diluted with 50 ml of water. The crude product was extracted with dichloromethane (3×100 ml), the combined organic extract was dried over $Na_2SO_4$ and then evaporated to dryness. The product was purified by flash chromatography on silica gel 60 (40-63 um, eluent: hexane-ethyl acetate=10:1, vol.). Yield: 2.10 g (66%) of a white solid.

2-(1H-inden-2-yl)-4-methyl-N-phenylaniline (N3) To a solution of 3.00 g (9.43 mmol) of 2-(2-(1H-inden-2-yl)phenyl)-4,4,5,5-tetramethyl-1,3,2-dioxaborolane in 100 ml of 1,4-dioxane 2.47 g (9.43 mmol) of 2-bromo-4-methyl-N-phenylaniline, 9.22 g (28.3 mmol) of cesium carbonate, 50 ml of water were subsequently added. This mixture was purged with argon for 10 min followed by addition of 0.44 g (0.38 mmol) of $Pd(PPh_3)_4$. The obtained mixture was stirred for 12 h at 90° C., then cooled to room temperature, and diluted with 50 ml of water. The crude product was extracted with dichloromethane (3×100 ml), the combined organic extract was dried over $Na_2SO_4$ and then evaporated to dryness. The product was purified by flash chromatography on silica gel 60 (40-63 um, eluent: hexane-ethyl acetate=10:1, vol.). Yield: 1.90 g (54%) of a white solid.

N-(Tert-butyl)-2'-(1H-inden-2-yl)-5-methyl-[1,1'-biphenyl]-2-amine (N4): To a solution of 2.70 g (8.48 mmol) of 2-(2-(1H-inden-2-yl)phenyl)-4,4,5,5-tetramethyl-1,3,2-dioxaborolane in 100 ml of 1,4-dioxane 2.09 g (8.48 mmol) of 2-bromo-N-(tert-butyl)-4-methylaniline, 8.31 g (25.5 mmol) of sodium carbonate, 50 ml of water were subsequently added. This mixture was purged with argon for 10 min followed by addition of 0.39 g (0.424 mmol) of $Pd(PPh_3)_4$. The obtained mixture was stirred for 12 h at 90° C., then cooled to room temperature, and diluted with 50 ml of water. The crude product was extracted with dichloromethane (3×100 ml), the combined organic extract was dried over $Na_2SO_4$ and then evaporated to dryness. The product was purified by flash chromatography on silica gel 60 (40-63 um, eluent: hexane-ethyl acetate=10:1, vol.). Yield: 2.73 g (91%) of a white solid.

General Procedure J for Synthesis of indenyl-anilido Titanium Dichlorides $^n$BuLi in hexanes (2.5 M, 12.8 mmol) was added to a solution of proligand (6.4 mmol) in THF (60 mL) at −78° C. This mixture was allowed to warm to room temperature, then stirred for 2 h, and, finally, cooled to −78° C. $Ti(NMe_2)_2Cl_2$ (6.4 mmol) was added in one portion at this temperature. The resulting mixture was warmed up to room temperature at vigorous stirring for 2 h and then evaporated to dryness. The crude product was extracted with hot toluene, and insoluble materials were removed by filtration through Celite. Then, dimethyldichlorosilane (0.86 ml, 7.05 mmol) was added to the obtained filtrate at room temperature, and the resulting mixture was stirred for 16 h at 50° C. The formed mixture was cooled to room temperature and then passed through short pad of Celite. The filtrate was evaporated to dryness, the residue was triturated in hot hexane (50 ml), and the obtained suspension was filtered through glass frit (G4). If needed the product can be recrystallized from a mixture of toluene and hexane.

Compounds Produced Via General Procedure J: C-4, C-5.

General Procedure K for Syntheses of N-Substituted-4-methyl-2-(4,4,5,5-tetramethyl-1,3,2-dioxaborolan-2-yl)anilines Palladium acetate (0.43 g, 1.9 mmol, 0.05 equiv.) was added to a solution of dppf (1.06 g, 1.9 mmol, 0.05 equiv.) in 1,4-dioxane (240 ml). Further on, dry potassium acetate (11.3 g, 115.2 mmol, 3.0 equivs.), N-substituted 2-bromoaniline (38.4 mmol, 1.0 equiv.), and 4,4,4',4',5,5,5',5'-octamethyl-2,2'-bi-1,3,2-dioxaborolane (11.7 g, 46.0 mmol, 1.2 equiv.) were added. The reaction mixture was stirred for 18 h at 100° C. The formed precipitate was filtered off (G4), washed with diethyl ether, and the resulting filtrate was evaporated to dryness. The product was isolated from the residue via flash-chromatography on silica gel 60 (40-63 um; eluent: hexane-dichloromethane=10:1, vol.).

Compounds produced via general procedure J: N-Phenyl-4-methyl-2-(4,4,5,5-tetramethyl-1,3,2-dioxaborolan-2-yl)aniline (N9).

General Procedure F for Syntheses of Proligands N11

N-Substituted-4-methyl-2-(4,4,5,5-tetramethyl-1,3,2-dioxaborolan-2-yl)aniline (58.8 mmol, 1.0 equiv.) was dissolved in 1,4-dioxane (52 ml) in a pressure vessel, and, then, 2-(indenyl/fluorenyl)bromobenzene (5.8 mmol, 1.0 equiv.) and 2.0 M $Cs_2CO_3$ (8.7 ml, 17.4 mmol, 3.0 equivs.) were added. The pressure vessel was purged with argon for 10 min, $Pd(PPh_3)_4$ (0.54 g, 0.46 mmol, 0.08 equiv.) was added, and this pressure vessel was tightly closed. The reaction mixture was stirred for 24 h at 100° C. and then evaporated to dryness. The crude product was extracted from the residue with dichloromethane. The organic extract was dried over $Na_2SO_4$ and then evaporated to dryness. The product was purified via flash-chromatography on silica gel 60 (40-63 um; hexane-dichloromethane=10:1, vol.).

Compound C-6 was produced from N11 via general procedure J.

Compound C-1 was manufactured according to the procedure of EP1059299. Compound C-2 was manufactured according to the procedure of Yano et al.

Polymerisation

Using the above listed inventive and comparative compounds as catalysts, a number of polymerisation experiments were conducted, of which the results are listed below.

The polymerizations were carried out in a Parallel Pressure Reactor (PPR48) for olefin polymerization. This equipment, containing 48 reactors mounted in a triple glove-box, was sold commercially by the company Symyx, thereafter by the company Freeslate. The applied polymerization protocols were as follows:

Prior to the execution of a library, the 48 PPR cells (reactors) undergo 'bake-and-purge' cycles overnight (8 h at 90-140° C. with intermittent dry N2 flow), to remove any contaminants and left-overs from previous experiments. After cooling to glove-box temperature, the stir tops are taken off, and the cells are fitted with disposable 10 mL glass inserts and PEEK stirring paddles (previously hot-dried under vacuum); the stir tops are then set back in place, the cells are loaded with the proper amounts of toluene (in the range 2.0-4.0 mL), comonomer (in the range 0.05-2.0 mL) and a tri-iso-butyl-aluminium (TiBAl)/butylated-hydroxy-toluene (BHT) (1:1 reaction product) solution, thermostated at 80° C., and brought to the operating pressure of 65 psig with ethylene.

The TiBAl/BHT amount was chosen such that [Al]=3 mM. In some cases the TiBAl/BHT mixture was replaced by MAO ([Al]=2 mM).

The activator was trityl-tetrakis-pentafluorophenylborate (TTB) using a [B]/[Ti] molar ratio of 10. In some cases, the TTB was replaced by methylaluminoxane. The catalyst injection sequence is as follows: proper volumes of a toluene 'chaser', a solution of the precatalyst in toluene (typically in the range 0.005-0.05 mmol L-1), and a toluene 'buffer' are uptaken into the slurry needle, and then injected into the cell of destination. The reaction is left to proceed under stirring (800 rpm) at constant temperature and pressure with continuous feed of ethylene for 5-60 min, and quenched by over-pressurizing the cell with dry air (preferred to other possible catalyst poisons because in case of cell or quench line leaks oxygen is promptly detected by the dedicated glove-box sensor).

After quenching, the cells are cooled down and vented, the stir-tops are removed, and the glass inserts containing the reaction phase are taken out and transferred to a Genevac EZ2-Plus centrifugal evaporator, where all volatiles are distilled out and the polymers are thoroughly dried overnight. Reaction yields are double-checked against on-line monomer conversion measurements by robotically weighing the dry polymers in a Bohdan Balance Automator while still in the reaction vials (subtracting the pre-recorded tare). Polymer aliquots are then sampled out for the characterizations.

GPC curves are recorded with a Freeslate Rapid GPC setup, equipped with a set of 2 mixed-bed Agilent PLgel 10 μm columns and a Polymer Char IR4 detector. The upper deck of the setup features a sample dissolution station for up to 48 samples in 10 mL magnetically stirred glass vials, 4 thermostated bays each accommodating 48 polymer solutions in 10 mL glass vials, and a dual arm robot with two heated injection needles. With robotic operation, pre-weighed polymer amounts (typically 1-4 mg) are dissolved in proper volumes of orthodichlorobenzene (ODCB) containing 0.40 mg mL-1 of 4-methyl-2,6-di-tert-butylphenol (BHT) as a stabilizer, so as to obtain solutions at a concentration of 0.5 to 1.0 mg mL-1. After 2-4 h at 150° C. under gentle stirring to ensure complete dissolution, the samples are transferred to a thermostated bay at 145° C., and sequentially injected into the system at 145° C. and a flow rate of 1.0 mL min-1. In post-trigger delay operation mode, the analysis time is 12.5 min per sample. Calibration is carried out with the universal method, using 10 monodisperse polystyrene samples ($M_n$ between 1.3 and 3700 KDa). Before and after each campaign, samples from a known i-PP batch produced with an ansa-zirconocene catalyst are analyzed for a consistency check. The weight average molecular weight ($M_w$) is expressed in kg/mol.

13C NMR spectra are recorded with a Bruker Avance 400 III spectrometer equipped with a 5 mm High Temperature Cryoprobe, and a robotic sample changer with pre-heated carousel (24 positions). The samples (20-30 mg) are dissolved at 120° C. in tetrachloroethane-1,2-d2 (0.6 mL), added with 0.40 mg mL-1 of BHT as a stabilizer, and loaded in the carousel maintained at the same temperature. The spectra are taken sequentially with automated tuning, matching and shimming. Typical operating conditions for routine measurements are: 45° pulse; acquisition time, 2.7 s; relaxation delay, 5.0 s; 400-800 transients (corresponding to an analysis time of 30-60 min). Broad-band proton decoupling is achieved with a modified WALTZ16 sequence (BI-_WALTZ16_32 by Bruker).

Unless specified otherwise, the catalyst activity is indicated by Rp, the calculated polymerisation rate, expressed as kilograms of copolymer, produced per mmol of catalyst per mol of ethylene in the reactor-diluent per hour.

The weight average molecular weight $M_w$ and the number average molecular weight $M_n$ were determined in accordance with ASTM D6474 (2012), and expressed in kg/mol. The molecular weight distribution MWD is calculated as $M_w/M_n$.

The hexene (C6) reactivity is expressed as mol percent hexene-incorporation in the copolymer (C6 inc., in mol %) per volume percent 1-hexene in the reaction diluent (C6 feed, in vol %). This reactivity is the averaged value of the polymerisation runs. Obviously, a higher hexene-incorporation per volume percent in the reaction-medium indicates a higher hexene reactivity.

People skilled in the art will recognize that when an alpha-olefin is incorporated in ethylene/alpha-olefin copolymerization, the molecular weight of the copolymer as well as the catalyst activity tend to be dependent on the amount of incorporated comonomer. In general, for instance, the molecular weight tends to decrease when the amount of incorporated comonomer increases. Therefore, when comparing molecular weights of copolymers obtained with different catalysts, the amount of incorporated comonomer has to be taken into account. This can, for instance, be done by performing at least two copolymerizations using different amounts of comonomer loading and fitting the correlation between $M_w$ and comonomer incorporation by an equation like for instance: $(1/Mw)=A+B\times(\text{mol \% comonomer in copolymer})$. By using the calculated parameters A and B, one can interpolate the $M_w$ of a copolymer at a different amount of comonomer incorporation. A similar approach can also be done for calculating the catalyst activity at a certain amount comonomer incorporation.

Experiments 1-44 were conducted as copolymerisation experiments using 1-hexene as comonomer, or homopolymerisation experiments, i.e. in those experiments where the vol % of C6 is 0.

| Exp. | Cat. | C6 (vol %) | Activity-Rp | $M_w$ (kg/mol) | PDI ($M_w/M_n$) | C6 inc (mol %) | Av. C6 reactivity (mol %/vol %) |
|---|---|---|---|---|---|---|---|
| 1 | I-1 | 0 | 20 | — | — | — | 4.4 |
| 2 | | 1 | 40 | 846 | 2.4 | 5.3 | |
| 3 | | 2 | 30 | 551 | 2.4 | 10.0 | |
| 4 | | 5 | 170 | 314 | 2.2 | 23.4 | |

-continued

| Exp. | Cat. | C6 (vol %) | Activity-Rp | $M_w$ (kg/mol) | PDI ($M_w$/$M_n$) | C6 inc (mol %) | Av. C6 reactivity (mol %/vol %) |
|---|---|---|---|---|---|---|---|
| 5 | | 10 | 360 | 182 | 2.3 | 41.0 | |
| 6 | | 10 | 50 | 185 | 2.4 | 33.0 | |
| 7 | I-2 | 0 | 120 | — | — | — | 4.5 |
| 8 | | 1 | 100 | 1030 | 3.3 | 5.6 | |
| 9 | | 2 | 120 | 714 | 2.8 | 12.5 | |

-continued

| Exp. | Cat. | C6 (vol %) | Activity-Rp | $M_w$ (kg/mol) | PDI ($M_w$/$M_n$) | C6 inc (mol %) | Av. C6 reactivity (mol %/vol %) |
|---|---|---|---|---|---|---|---|
| 10 | | 5 | 240 | 402 | 2.5 | 25.4 | |
| 11 | | 10 | 500 | 302 | 2.4 | 38.0 | |
| 12 | I-3 | 0 | 100 | — | — | — | 6.2 |
| 13 | | 1 | 140 | 633 | 3.3 | 6.6 | |
| 14 | | 2 | 290 | 450 | 3.3 | 12.9 | |
| 15 | | 5 | 520 | 242 | 3.2 | 27.1 | |
| 16 | | 10 | 1070 | 185 | 2.2 | 43.0 | |
| 17 | I-4 | 0 | 1080 | — | — | — | 4.3 |
| 18 | | 1 | 270 | 702 | 3.3 | 3.9 | |
| 19 | | 2 | 1160 | 254 | 2.4 | 9.5 | |
| 20 | I-5 | 1 | 80 | 1417 | 4.5 | 5.7 | 6.7 |
| 21 | | 2 | 140 | 628 | 3.5 | 15.3 | |
| 22 | I-6 | 2 | 60 | 258 | 8.3 | 13.4 | 6.7 |
| 23 | I-7 | 2 | 20 | 449 | 14.0 | 13.0 | 6.5 |
| 24 | I-8 | 1 | 40 | 1512 | 3.8 | 7.0 | 5.9 |
| 25 | | 2 | 90 | 567 | 3.0 | 9.5 | |
| 26 | I-9 | 2 | 350 | 330 | 2.3 | 12.1 | 6.0 |
| 27 | C-1 | 0 | 724 | — | — | — | 0.1 |
| 28 | | 10 | 478 | 386 | 2.9 | 1.0 | |
| 29 | | 40 | 160 | 222 | 3.0 | 4.1 | |
| 30 | C-2 | 0 | 680 | — | — | — | 1.2 |
| 31 | | 1 | 620 | 470 | 2.5 | 1.3 | |
| 32 | | 5 | 580 | 345 | 2.4 | 6.6 | |
| 33 | | 20 | 520 | 172 | 2.2 | 23.1 | |
| 34 | C-3 | 0 | 20 | — | — | — | — |
| 35 | | 10 | 74 | 0.7 | — | — | |
| 36 | C-4 | 0 | 300 | — | — | — | 0.8 |
| 37 | | 2 | 1300 | 1418 | 3.9 | 1.6 | |
| 38 | | 5 | 290 | 823 | 4.0 | 3.6 | |
| 39 | | 10 | 260 | 547 | 4.9 | 9.2 | |
| 40 | C-5 | 0 | 300 | — | — | — | 1.2 |
| 41 | | 2 | 410 | 1425 | 4.1 | 1.4 | |
| 42 | | 10 | 100 | 393 | 3.9 | 13.1 | |
| 43 | C-6 | 1 | 80 | 3155 | 6.9 | 1.8 | 1.9 |
| 44 | | 5 | 40 | 1579 | 7.2 | 10.4 | |

In experiments 27, 28, 29, 30, 31, 32, 33, methylaluminoxane was used as activator. In experiments 6, 34, 35, tri-isobutylaluminium/BHT and tritylborate were used as scavenger/activator. In experiments 19, 21, 22, 23, 25, methylaluminoxane and tritylborate were used as scavenger/activator.

From these results it is apparent that the inventive catalysts display an excellent comonomer incorporation, as is illustrated by the higher hexene-reactivity in comparison to the comparative catalysts. In addition, the inventive catalysts display high catalyst activity combined with high molecular weight copolymers.

A further number of experiments were conducted wherein different comonomers were used, as presented in the table below.

| Exp. | Cat. | Comonomer | Comonomer feed (vol %) | Activity-Rp | $M_w$ (kg/mol) | PDI ($M_w$/$M_n$) | Comonomer inc. (mol %) |
|---|---|---|---|---|---|---|---|
| 45 | I-1 | 1-hexene | 10.0 | 363 | 182 | 2.3 | 41.0 |
| 46 | | 4MP1 | 1.0 | 58 | 693 | 3.2 | |
| 47 | | | 10.0 | 320 | 191 | 2.2 | 29.2 |
| 48 | | VCH | 2.0 | 841 | 218 | 2.3 | 5.5 |
| 49 | | | 10.0 | 515 | 49 | 2.1 | 17.6 |
| 50 | I-2 | 4MP1 | 1.0 | 74 | 1336 | 3.3 | |
| 51 | | VCH | 2.0 | 57 | 1812 | 3.5 | 5.1 |
| 52 | | | 10.0 | 18 | 714 | 4.8 | 16.7 |
| 53 | C-2 | 1-hexene | 10.0 | 553 | 261 | 2.2 | 13.0 |
| 54 | | 4MP1 | 10.0 | 776 | 401 | 2.2 | 8.4 |
| 55 | | VCH | 10.0 | 448 | 605 | 2.2 | 1.1 |

Wherein:

Comonomer feed is the vol % of comonomer in the reactor diluent

Comonomer inc. means the mol % of comonomer incorporated in the polymer

4MP1 is 4-methyl-pentene-1

VCH is vinyl cyclohexane

The results with the sterically hindered comonomers, like 4-methyl-pentene-1 and vinyl-cyclohexane illustrate that the inventive catalysts display excellent incorporation of these comonomers. For instance, when comparing the experiments using 10 vol % VCH in the feed, Comparative catalyst C-2 only incorporates 1.1 mol % VCH, whereas Inventive catalysts I-1 and I-2 incorporate 17.6 respectively 16.7 mol % VCH.

To further illustrate the reactivity of the Inventive catalysts towards sterically crowded comonomers, additional tests were performed with Inventive catalyst I-2 using the sterically crowded comonomer 3,3-dimethyl-1-butene (3,3-DMB1), the results of which are presented below.

| Exp. | 3,3-DMB1 feed (vol %) | Rp | Mw (kg/mol) | PDI ($M_w$/$M_n$) | Comonomer inc (mol %) |
|---|---|---|---|---|---|
| 74 | 10 | 50.6 | 128.4 | 2.9 | 2.0 |
| 75 | 30 | 11.7 | 89.1 | 2.2 | 3.7 |
| 76 | 40 | 10.9 | 63.7 | 2.1 | 5.0 |

A further number of experiments were performed using 1-hexene and VCH as comonomers at higher polymerisation temperatures, the results of which are presented in the table below. Note that the catalyst activity, indicated by Rp, the calculated polymerisation rate, is in this case expressed as grams of copolymer per mmol catalyst per minute per bar of ethylene.

| Exp. | Cat. | Comonomer | Comonomer feed (vol %) | Rp | $M_w$ (kg/mol) | PDI ($M_w/M_n$) | Comonomer inc. (mol %) |
|---|---|---|---|---|---|---|---|
| 56 | I-2 | 1-hexene | 2.5 | 87 | 364 | 3.3 | 9.5 |
| 57 | | | 5.0 | 478 | 187 | 3.1 | 15.2 |
| 58 | I-10 | 1-hexene | 2.5 | 29 | 606 | 3.7 | 7.8 |
| 59 | | | 5.0 | 304 | 289 | 3.2 | 14.0 |
| 60 | I-2 | VCH | 5.0 | 435 | 142 | 2.5 | 4.7 |
| 61 | | | 10.0 | 435 | 86 | 2.3 | 9.5 |
| 62 | I-10 | VCH | 5.0 | 188 | 144 | 2.7 | 4.5 |
| 63 | | | 10.0 | 160 | 101 | 2.5 | 8.2 |
| 64 | I-2 | VCH | 5.0 | 696 | 117 | 2.5 | 7.9 |
| 65 | | | 10.0 | 609 | 92 | 2.2 | 11.6 |
| 66 | I-10 | VCH | 5.0 | 232 | 154 | 2.5 | 7.5 |
| 67 | | | 10.0 | 319 | 102 | 2.4 | 11.2 |
| 68 | I-12 | 1-hexene | 2.5 | 58 | 403 | 2.4 | 7.4 |
| 69 | | | 5.0 | 536 | 207 | 2.5 | 12.9 |
| 70 | | VCH | 5.0 | 319 | 53 | 2.2 | 7.4 |
| 71 | | | 10.0 | 218 | 30 | 2.2 | 11.6 |
| 72 | | | 5.0 | 276 | 48 | 2.3 | 5.7 |
| 73 | | | 10.0 | 304 | 32 | 2.3 | 9.9 |

Experiments 56-69, 72, 73 were performed at 150° C. at total pressure of 1.38 MPa. Experiments 64-67, 70 and 71 were performed at 130° C. at total pressure of 1.14 MPa.

The experiments at elevated polymerization temperature illustrate that the inventive catalysts are able to produce commercially relevant molecular weight copolymers at temperatures that are representative for a high temperature solution process, useful for instance for the production of linear low-density polyethylene, polyolefin plastomers or elastomers.

The invention claimed is:

1. A compound according to formula:

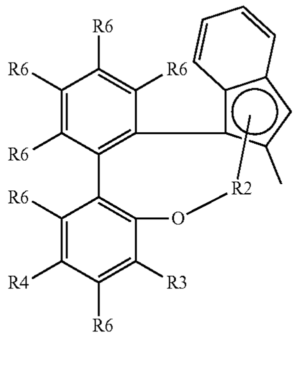

wherein:

R2 is a moiety $M(R5)_2$ or MR5, wherein M is a metal selected from hafnium, titanium or zirconium, and R5 is F, Cl, I, Br or an alkyl-moiety comprising 1 to 10 carbon atoms;

R3 is H, an alkyl or aryl moiety comprising 1 to 10 carbon atoms, or a moiety comprising N or O and 1 to 15 carbon atoms;

R4 is H, an alkyl or aryl moiety comprising 1 to 10 carbon atoms, or a moiety comprising N or O and 1 to 15 carbon atoms, or a halogen;

wherein if R3 is H, R4 is a moiety other than H, and if R4 is H, R3 is a moiety other than H;

each R6 is individually selected from H, a halogen, an alkyl moiety, an aryl moiety, a halogen-substituted alkyl moiety, a halogen-substituted aryl moiety, an alkoxy moiety, a siloxy-moiety, or a nitrogen-containing moiety.

2. The compound according to claim 1, wherein the compound is a compound according to formula:

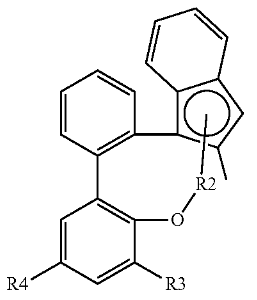

wherein:

R2 is a moiety $M(R5)_2$ or MR5, wherein M is a metal selected from hafnium, titanium or zirconium, and R5 is F, Cl, I, Br or an alkyl-moiety comprising 1 to 10 carbon atoms;

R3 is H, an alkyl or aryl moiety comprising 1 to 10 carbon atoms, or a moiety comprising N or O and 1 to 15 carbon atoms;

R4 is H, an alkyl or aryl moiety comprising 1 to 10 carbon atoms, or a moiety comprising N or O and 1 to 15 carbon atoms, or a halogen;

wherein if R3 is H, R4 is a moiety other than H, and if R4 is H, R3 is a moiety other than H.

3. The compound according to claim 1, wherein R2 is selected from $ZrCl_2$, $TiCl_2$, $HfCl_2$, $Zr(CH_3)_2$, $Ti(CH_3)_2$, or $Hf(CH_3)_2$.

4. The compound according to claim 1, wherein each R3 and R4 individually is selected from fluorine, a methyl moiety, a phenyl moiety, a t-butyl moiety, a methoxy moiety, or a 9-carbazole moiety.

5. The compound according to claim 1, wherein the compound is supported onto a polymeric support, a clay material, or an inorganic oxide.

6. A catalyst composition comprising the compound according to claim 1, wherein the composition further comprises an activator.

7. A catalyst composition comprising the compound according to claim 1, wherein the catalyst composition further comprises a main group organometallic compound.

8. A catalyst composition comprising the compound according to claim 1, wherein the catalyst composition further comprises a compound containing at least one active hydrogen.

9. A process for the polymerization of olefins, wherein the process is a homopolymerization process of ethylene or propylene, or a copolymerization process of ethylene or propylene with one or more comonomer(s) in the presence of the catalyst composition according to claim 6.

10. The process according to claim 9, wherein the process is a copolymerization process of ethylene with one or more comonomer(s), wherein the comonomer(s) are selected from 1-butene, 1-hexene, 1-octene, norbornene, vinyl-cyclohexane, styrene, and 4-methyl-1-pentene.

11. A polymer comprising the compound of claim 1.

* * * * *